United States Patent [19]

Suzuki et al.

[11] Patent Number: 4,713,571

[45] Date of Patent: Dec. 15, 1987

[54] DRIVING CIRCUIT OF A VIBRATION WAVE MOTOR

[75] Inventors: Nobuyuki Suzuki, Yokohama; Masao Shimizu, Kawasaki; Mitsuhiro Katsuragawa, Tanashi, all of Japan

[73] Assignee: Canon Kabushiki Kaisha, Tokyo, Japan

[21] Appl. No.: 5,871

[22] Filed: Jan. 21, 1987

[30] Foreign Application Priority Data

Jan. 23, 1986 [JP] Japan .................................. 61-012880
Feb. 13, 1986 [JP] Japan .................................. 61-029790
Feb. 14, 1986 [JP] Japan .................................. 61-031395

[51] Int. Cl.$^4$ ........................................... H01L 41/08
[52] U.S. Cl. ...................................... 310/316; 310/323; 310/328
[58] Field of Search .............. 310/316, 317, 319, 323, 310/328

[56] References Cited

U.S. PATENT DOCUMENTS 4,510,411  4/1985  Hakamata et al. .............. 310/323 X
4,658,172  4/1987  Izukawa .......................... 310/323 X

FOREIGN PATENT DOCUMENTS 0204477  11/1984  Japan .................................. 310/323

*Primary Examiner*—Mark O. Budd
*Attorney, Agent, or Firm*—Fitzpatrick, Cella, Harper & Scinto

[57] ABSTRACT

This specification discloses a vibration wave motor in which frequency signals of different phases are applied to electro-mechanical energy converting elements such as electrostrictive elements disposed at different positions to thereby form a travelling vibration wave in a member in which the converting elements are disposed and a moving member is driven by the vibration wave and particularly in which the phase difference between the frequency signals applied to the energy converting elements is held at a particular value.

18 Claims, 31 Drawing Figures

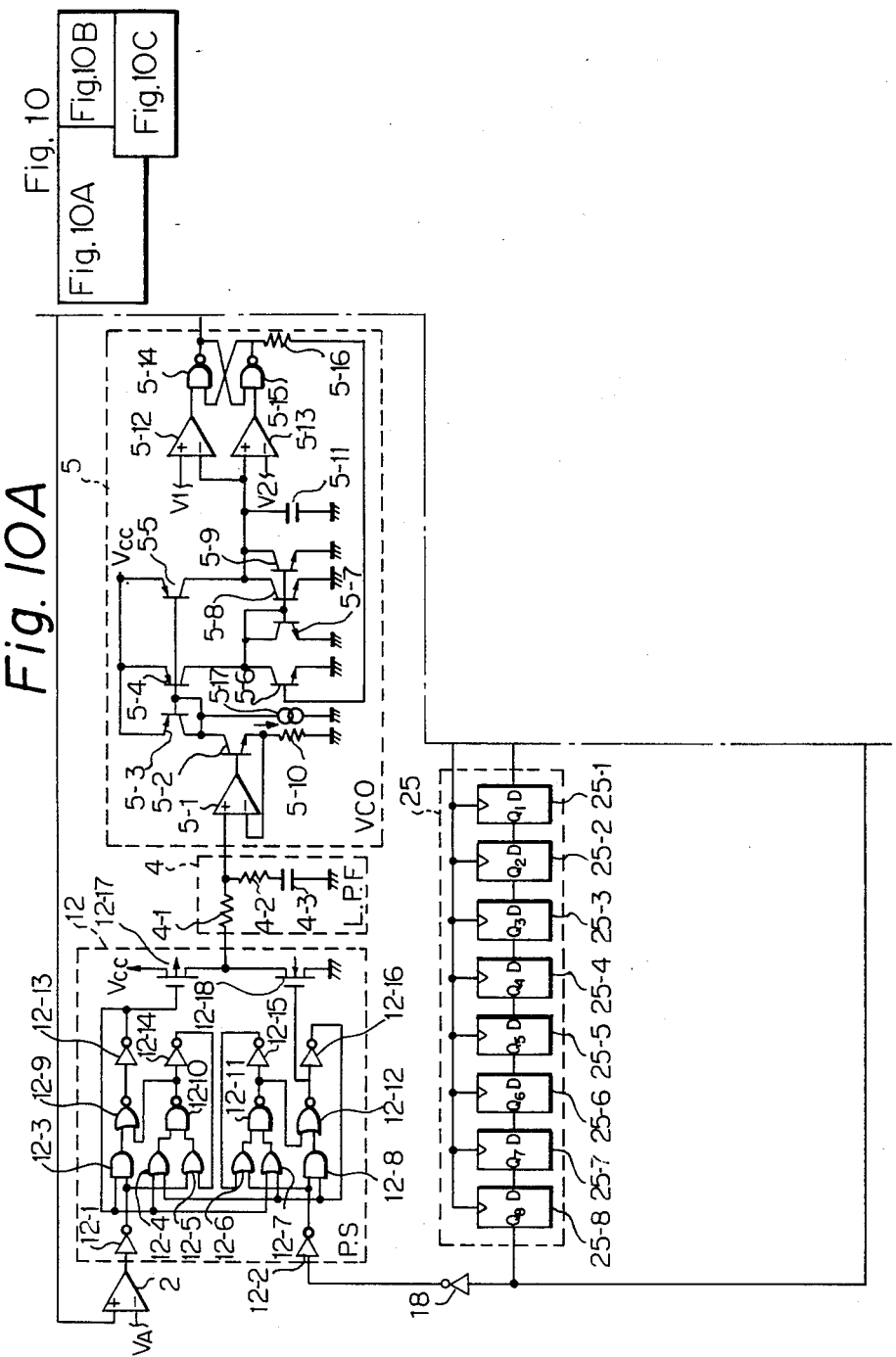

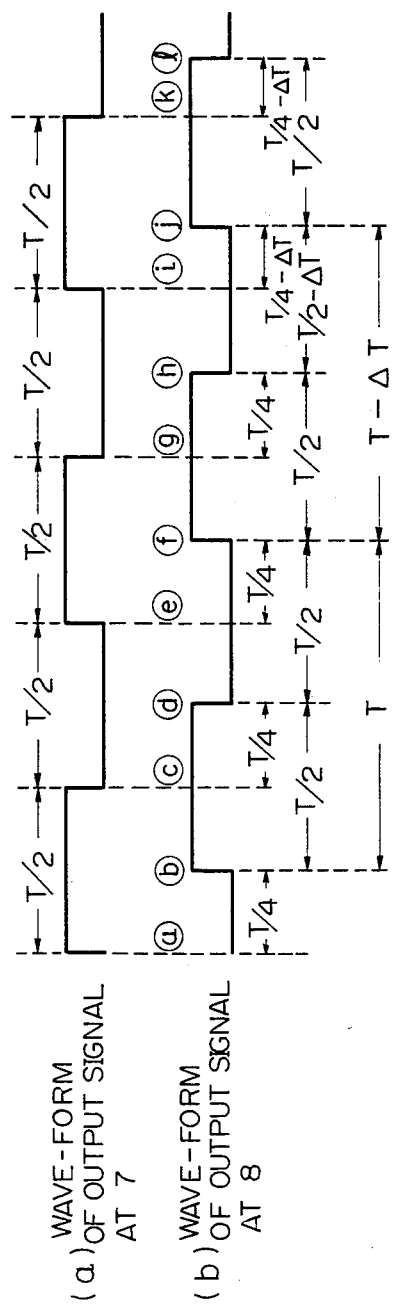

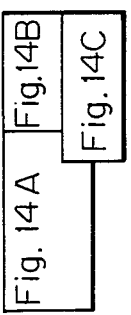
*Fig. 14A*
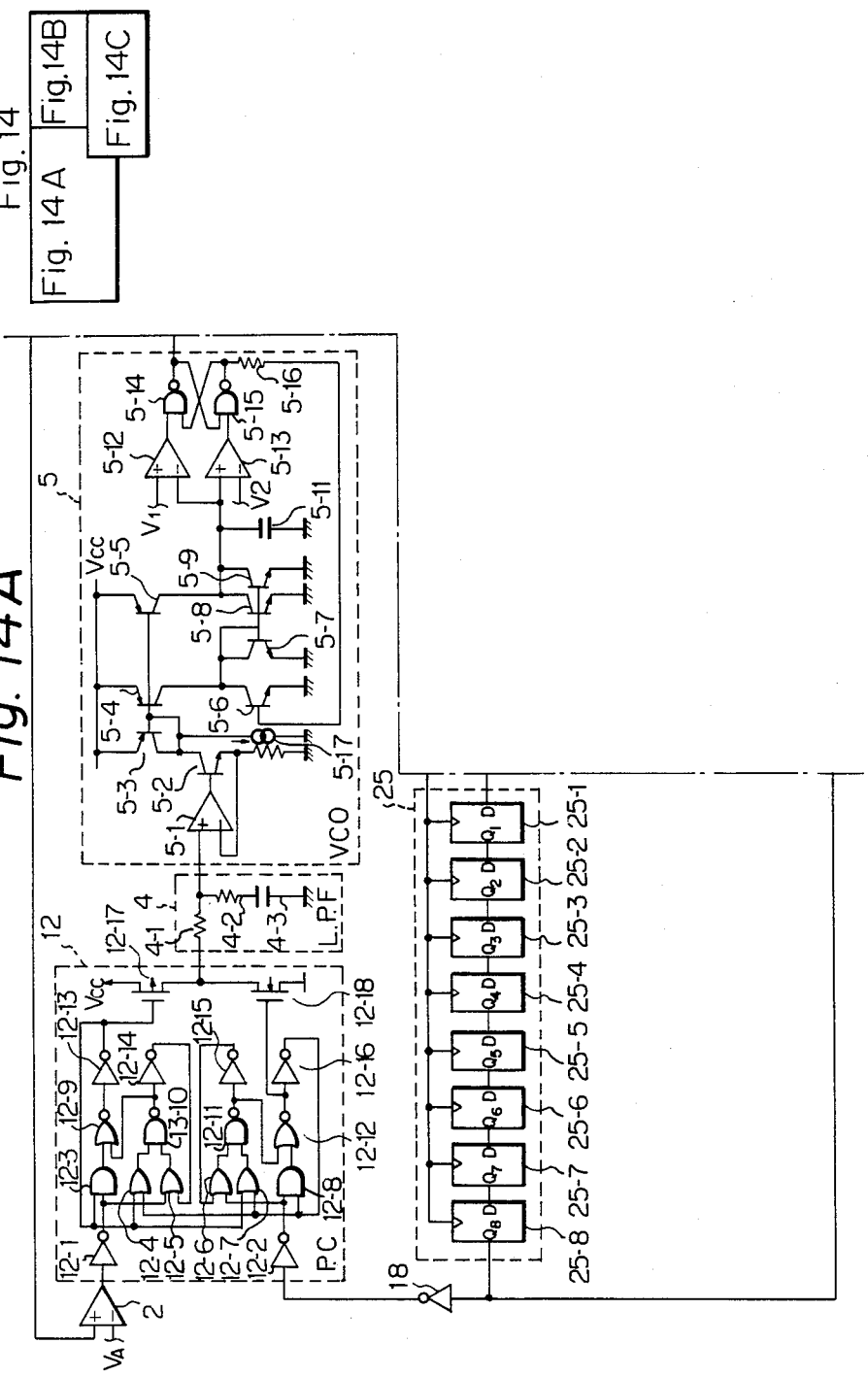

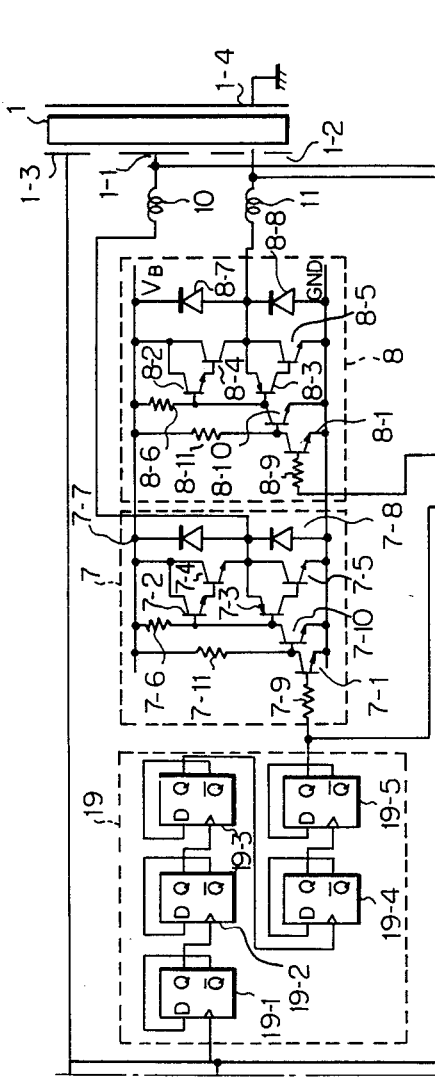

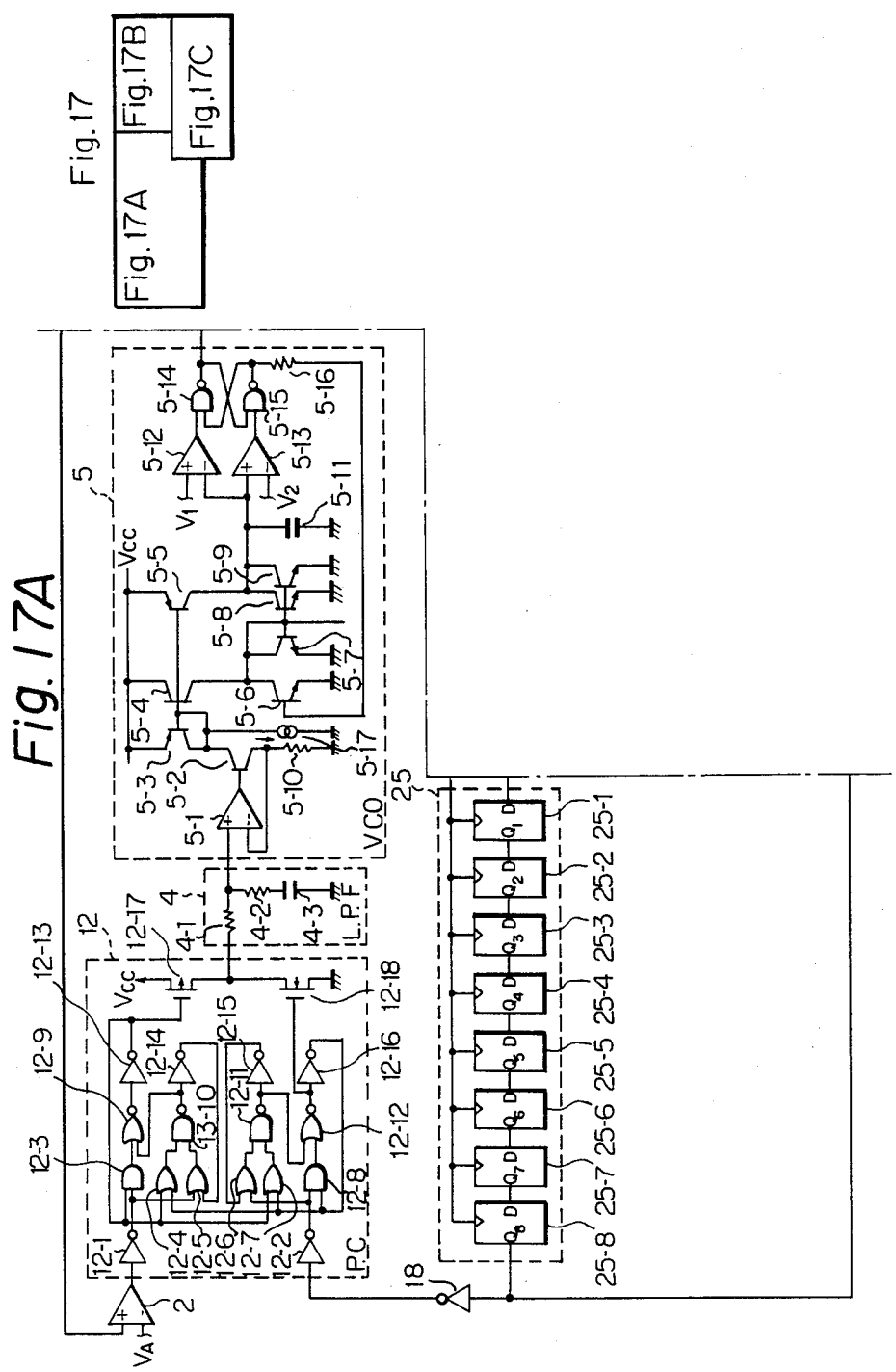

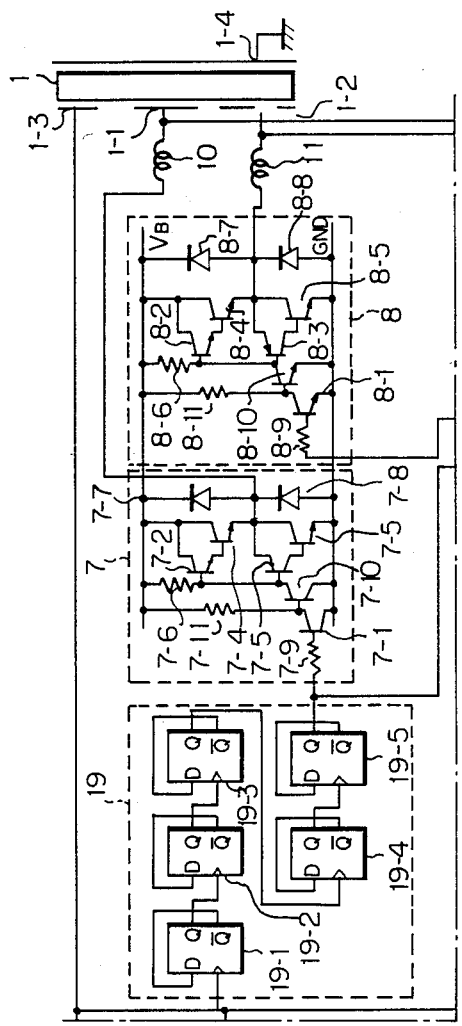

DRIVING CIRCUIT OF A VIBRATION WAVE MOTOR

BACKGROUND OF THE INVENTION

1. Field of the Invention

This invention relates to a driving circuit of an ultrasonic wave (vibration wave) motor in which electro-mechanical energy converting elements such as electrostrictive elements, magnetostrictive elements or piezoelectric elements are used to generate a travelling vibration wave and a rotor is driven by the vibration wave.

2. Related Background Art

In an ultrasonic wave motor, as shown in FIG. 1 of the accompanying drawings, an electrostrictive element polarization-treated in a conventional phase relation is disposed on the surface of a ring-shaped stator, and on the electrostrictive element, driving periodic voltages which are 90° out of phase with each other are applied to driving electrodes 1-1 and 1-2 to generate a travelling vibration wave in the surface of the stator and a moving member which is in frictional contact with the stator is moved by the vibration wave.

When voltages are to be applied to the driving electrodes 1-1 and 1-2, periodic voltages which are 90° out of phase with each other are applied through an amplifier 7, coil 10, electrode 1-1 and an amplifier 8, coil 11, electrode 1-2, as shown in FIG. 2 of the accompanying drawings.

As regards the phase relation between the amplifier 7, the coil 10 and the electrode 1-1, considering an electrical equivalent circuit between the driving electrode 1-1 and a common electrode 1-4 (including an electrostrictive element), the equivalent circuit is represented as a series circuit of a resistor and a capacitor and therefore, the output voltage of the amplifier 7 and the signal at the junction between the coil 10 and the electrode 1-1 become different in phase.

The above-described phase relation also holds true of the phase difference relation between the output of the amplifier 8 and the signal at the junction between the coil 11 and the electrode 1-2.

Consequently, if the electrical characteristics of the coil 10 and the coil 11 and of the electrode 1-1 and the electrode 1-2 are just the same, even if there is a phase difference between the junction between the coil and the electrode and the output of the amplifier, the phase relation between the junction between the electrode 1-1 and the coil 10 and the junction between the electrode 1-2 and the coil 11 is just the same as the phase relation between the amplifiers 7 and 8 and therefore, no problem will arise if the phase difference between the outputs of the amplifiers 7 and 8 is 90°.

However, it is difficult to make the characteristics of the coils 10 and 11 and of the electrodes 1-1 and 1-2 entirely identical and it is also difficult to make the characteristics of the amplifiers 7 and 8 entirely identical and therefore, even if the input signals to the amplifiers 7 and 8 are signals which are 90° out of phase with each other, it is difficult to ensure the phase characteristics of the amplifiers 7 and 8 to be accurately 90° out of phase.

Also, there is no assurance that the relation between the moving member and the stator 1 is entirely uniform due to the angle of rotation thereof.

Accordingly, even if the formed driving signals have a 90° phase difference relation, it has been impossible that the signals actually applied to the electrodes 1-1 and 1-2 are 90° out of phase with each other.

SUMMARY OF THE INVENTION

One aspect of the present application is to provide a driving circuit of an ultrasonic wave (vibration wave) motor in which frequency voltages different in phase are applied through first and second driving electrodes to the surface of a structure in which electro-mechanical energy converting elements are disposed to thereby generate a travelling vibration wave in the surface of said structure and relative movement of a second structure and a first structure is effected by the vibration wave and which is provided with a detecting circuit for detecting the shift of the phase difference between driving wave forms in said first and second driving electrodes relative to a particular phase difference, and a control circuit responsive to the output of said detecting circuit to control the phase difference between frequency voltages applied to the first and second electrodes, thereby holding the phase difference to the driving electrodes at a particular phase difference.

Another aspect of the present application is to provide a driving circuit of an ultrasonic wave (vibration wave) motor in which in order to prevent the applied voltage (duty) to the electrodes from repetitively varying about a certain control value when the phase difference between the electrodes is controlled so as to be constant, the detecting circuit and the control circuit are operated with their frequencies of operation being thinned or the average value of the shift detected by the detecting circuit is found and the phase difference between the electrodes controlled by the control circuit is determined in conformity with said average value.

Other objects of the present invention will become apparent from the following detailed description of some embodiments thereof taken in conjunction with the accompanying drawings.

BRIEF DESCRIPTION OF THE DRAWINGS

FIGS. 11(a) and (b) are wave form diagrams showing the controlled states of the frequency voltages to the electrodes in an ultrasonic wave (vibration wave) motor.

DESCRIPTION OF THE PREFERRED EMBODIMENTS

Figure 1:
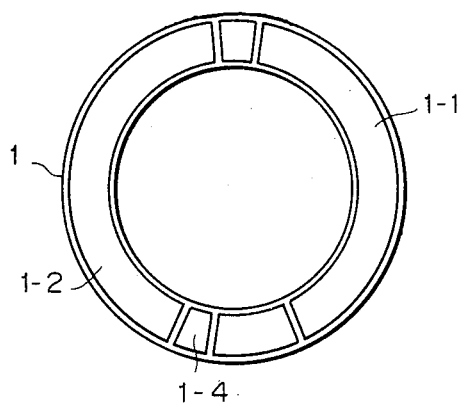
FIG. 1 is a wave form diagram showing the shape of the electrodes of the stator of an ultrasonic wave (vibration wave) motor.
Figure 2:
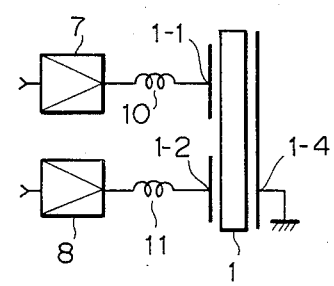
FIG. 2 is a circuit diagram showing the construction of a circuit portion for applying driving voltages to the electrodes of FIG. 1.
Figure 3:
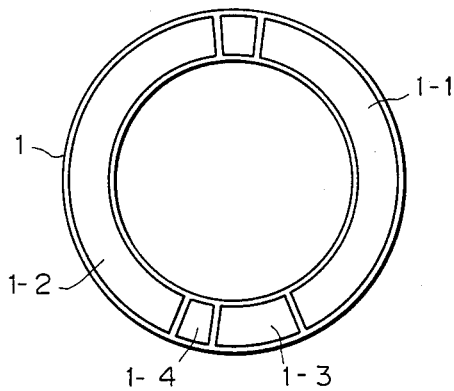
FIG. 3 is a wave form diagram showing the shape of the electrodes of the stator of an ultrasonic wave (vibration wave) motor according to the present invention.

FIG. 3 shows the configuration of the electrodes of the stator of an ultrasonic wave motor according to the present invention, and the construction of FIG. 3 is the same as the construction of FIG. 1. Reference numeral 1-3 designates a monitor electrode for detecting the resonant state of the stator, and a common electrode 1-4 is connected to electrodes opposed to electrodes 1-1, 1-2 and 1-3, respectively.

Figure 4:
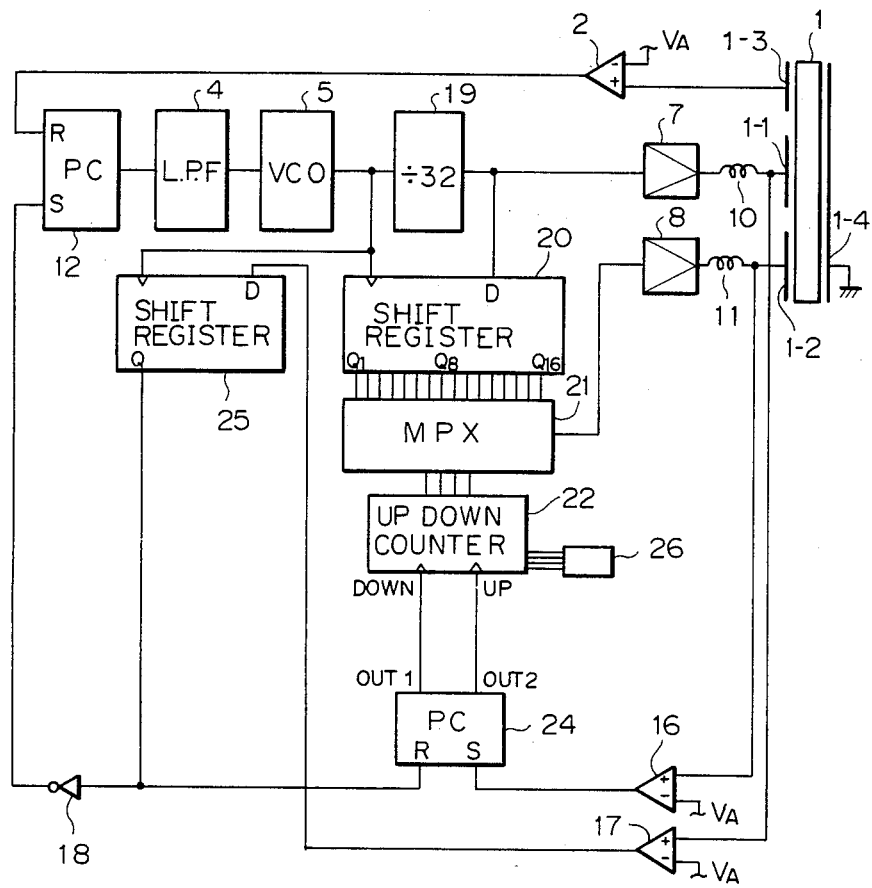
FIG. 4 is a block diagram showing an embodiment of the driving circuit of the ultrasonic wave (vibration wave) motor according to the present invention.

FIG. 4 is a circuit diagram showing an embodiment of the driving circuit of an ultrasonic wave motor (hereinafter referred to as SSM) according to the present invention.

In FIG. 4, reference numeral 1 denotes a stator on the surface of which is disposed an electrostrictive element, reference numerals 1-1, 1-2 and 1-3 designate the electrodes shown in FIG. 3, reference numerals 10 and 11 denote coils, and reference numerals 7 and 8 designate amplifiers.

Reference numerals 16 and 17 denote comparators connected to the electrodes 1-2 and 1-1, respectively, for shaping the sine waves of these electrodes and converting them to pulses of logic level. Reference numeral 2 designates a comparator for converting the output wave form (sine wave) of the monitor electrode to a pulse of logic level. Reference numeral 12 denotes a phase comparator (a phase comparing circuit) having one input end thereof connected to the output of the comparator 2 and the other input end connected to an inverter 18. Such phase comparator is well known from U.S. Pat. No. 4,291,274 and need not be described in detail. It detects the phase difference between input signals and produces an output only when there is a phase difference.

Figure 5:
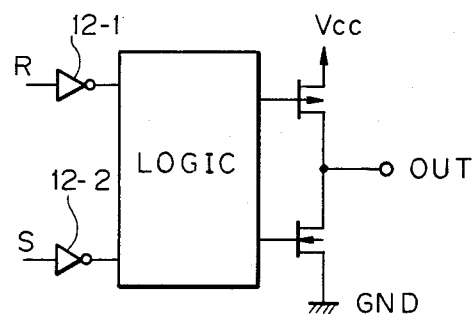
FIG. 5 is a block diagram showing the construction of a comparator 12 shown in FIG. 4.
Figure 6:
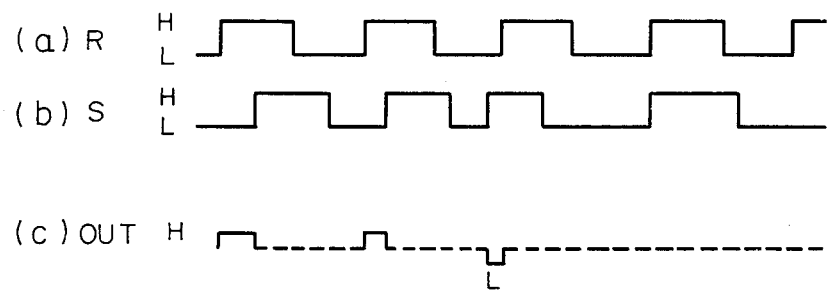
FIGS. 6(a), (b) and (c) are wave form diagrams showing the characteristics of the comparator shown in FIG. 5.

The block construction and input-output characteristics of the comparator 12 are as shown in FIGS. 5 and 6. If an input pulse (rising signal) to an input end R is input earlier than a rising signal to an input end S, the output becomes Vcc (a high level signal, hereinafter referred to as H) only during the period of the difference between the rising signals, and the output assumes an open state (a high impedance state) by the inputting of the rising signal to the input end S.

Also, if the input pulse (rising signal) to the input end S is input earlier than the rising signal to the input end R, the output assumes a ground level (low level, hereinafter referred to as L) during the rising signal period.

In the other cases than the case where the output indicates H or L, the output assumes the open state. Consequently, when the phase difference is zero, the output remains in the open state.

Reference numeral 4 designates a low-pass filter which smoothes the output of the comparator 12. Reference numeral 5 denotes a voltage control oscillator (VCO) which outputs a signal of a duty ratio 50% at a frequency conforming to an input voltage. The input of the VCO 5 is connected to the output of the low-pass filter 4.

Reference numeral 19 designates a frequency dividing circuit for dividing the output of the VCO 5 into 32. The output of the frequency dividing circuit 19 is applied to the electrode 1-1 through the amplifier 7 and the coil 10. Also, the output of the frequency dividing circuit 19 is connected to the D input end of a 16-stage shift register 20. The output of the VCO 5 is input as a clock pulse to the clock terminal of the register 20. The frequency of the VCO 5 to the output pulse of the frequency dividing circuit 19 is 32 times and therefore, the relation of the D input and the clock pulse to the register 20 is also 32 times and thus, the outputs $Q_1$–$Q_{16}$ of the shift register 20 are such that pulses out of phase (delayed) by 11.25° each from 0° to 180° with respect to the D input signal are output. The oscillation frequency of the VCO 5 is set to 32 times the resonance frequency of the SSM. Reference numeral 21 designates a multiplexer which selects one of the outputs $Q_1$–$Q_{16}$ of the register 20 on the basis of the output of a counter 22. The output of the multiplexer 21 is applied to the electrode 1-2 through the amplifier 8 and the coil 11. Reference numeral 25 denotes an 8-stage shift register. The output of the comparator 17 is input to the D input end of the register 25 and the output of the VCO 5 is input to the clock input of the register 25 and therefore, a pulse delayed by 90° relative to the input signal to the D input end is output from the output end $Q_8$. That is, the output pulse of the frequency dividing circuit 19 and the output pulse of the comparator 17 are pulses of the same phase relation and therefore, such pulses are input as D input, and the output $Q_8$ of the eighth stage of the shift register 25 to which the output of the VCO 5 is input as a clock becomes a pulse delayed by 90° relative to the D input signal, i.e., the signal of the electrode 1-1.

Figure 7:
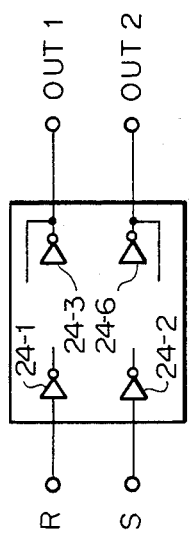
FIG. 7 is a block diagram showing the construction of the comparator 24 of FIG. 4.
Figure 8:
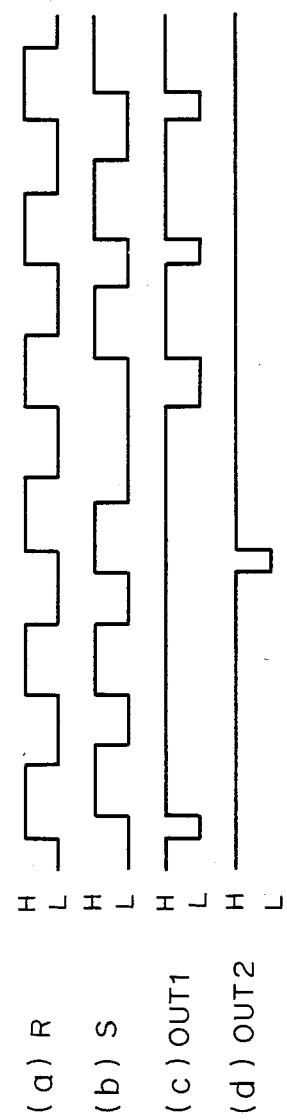
FIGS. 8(a), (b), (c) and (d) are wave form diagrams showing the characteristics of a comparator shown in FIG. 7.

Reference numeral 24 denotes a phase comparator. The block construction and input-output characteristics of this comparator 24 are as shown in FIGS. 7 and 8, and if the pulse to an input end R rises earlier than the pulse to an input end S, OUT1 is rendered into L until the pulse to the input end S rises. Also, if the pulse to the input end S rises earlier than the pulse to the input end R, OUT2 is rendered into L until the pulse to the input end R rises.

The input end S of the comparator 24 is connected to the output end of the comparator 16, and the input end R is connected to the output end $Q_8$ of the register 25.

Figure 9:
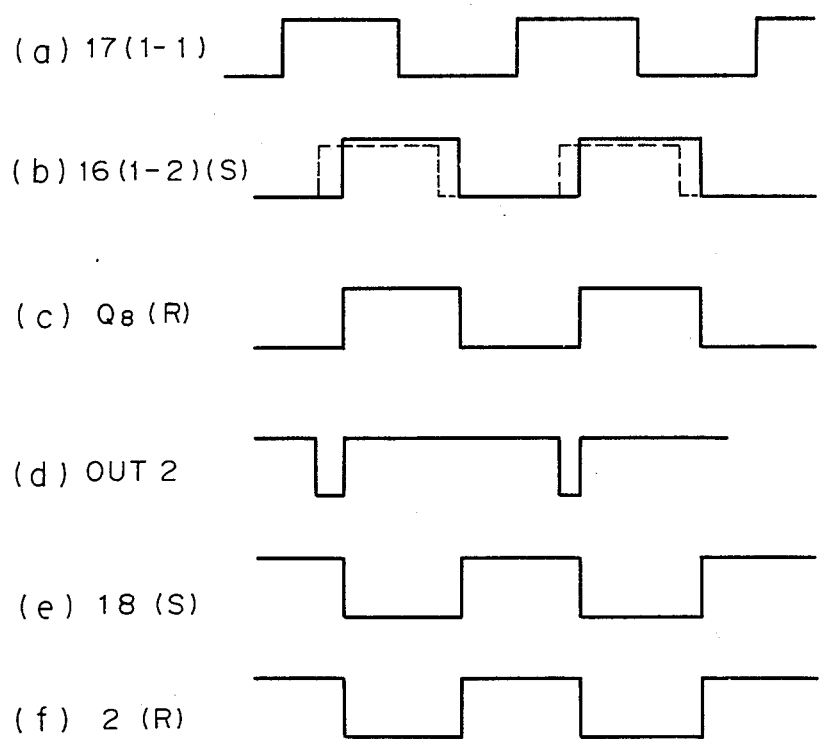
FIGS. 9(a), (b), (c), (d), (e) and (f) are wave form diagrams illustrating the operation of the embodiment shown in FIG. 4.

As described above, the pulse from the output $Q_8$ of the register 25 is a pulse delayed by 90° (FIG. 9(c)) relative to the wave form of the electrode 1-1 {the output of the comparator 17 (FIG. 9(a))}, and this is input to the R input end of the comparator 24 and a pulse of the same phase as the wave form of the electrode 1-2 {the output of the comparator 16 (FIG. 9(b))} is input to the S input end of the comparator 24. Consequently, in a state wherein the wave forms of the electrodes 1-1 and 1-2 are 90° out of phase, pulses of the same phase are input as the R and S inputs of the comparator 24 and therefore, both of the outputs OUT1 and OUT2 of the comparator 24 output H. Also, when, as indicated by dotted line in FIG. 9(b), the wave form of the electrode 1-2, i.e., the pulse of the comparator 16, assumes a phase relation within 90° relative to the wave form of the electrode 1-1, i.e., the pulse of the comparator 17, the rising pulse to the S input end of the comparator 24 occurs earlier than the rising pulse to the R input end and therefore, the comparator 24 renders the output end OUT2 into L. Conversely, when the phase relation of the pulse of the comparator 16 to the pulse of the comparator 17 is 90° or more, the output end OUT1 of the comparator 24 is rendered into L.

Reference numeral 22 designates an up-down counter which effects up and down operation of one step in response to the falling signal to the up input and down input ends. The up input end of the counter 22 is connected to the output end OUT2 of the comparator 24 and the down input end of the counter 22 is connected to the output end OUT1 of the comparator 24 and therefore, when the phase relation between the wave forms of the electrodes 1-1 and 1-2 is within 90°, the counter 22 effects up count and conversely, when said phase relation is 90° or more, the counter 22 effects down count. The output (4 bits) of the counter 22 is connected to the multiplexer 21, which is designed to select the output of the rear stage bit of the register 20 as the count value of the counter increases. By the construction of the comparator 24, counter 22 and multiplexer 21, count up of the counter 22 is effected and the rear stage output of the register 20 is selected when the phase relation between the wave forms of the electrodes 1-1 and 1-2 is within 90°, and therefore the wave form applied to the electrode 1-2 is delayed to shift the phase relation between the wave forms of the electrodes 1-1 and 1-2 toward 90°. Conversely, when the phase relation between the wave forms of the electrodes 1-1 and 1-2 becomes 90° or more, count down is effected to shift the phase relation toward 90°, and the phase relation between the wave forms of the electrodes 1-1 and 1-2 is controlled so as to be always 90°.

It is to be understood that the arrangement relation between the electrode 1-1 and the electrode 1-3 is in a positional relation wherein they are 90° out of phase with each other. The operation of the embodiment of FIG. 4 will now be described.

By a main switch, not shown, being closed, a power-up set circuit 26 is operated and the initial value (e.g. 0111) is set in the counter 22. It is to be understood that in this state, the multiplexer 21 is selecting the output end $Q_8$ of the register 20.

As described above, the output ends $Q_1$–$Q_8$ of the register 20 provide signals 11.25° out of phase with respect to the D input signal thereof and therefore, the pulse of the output end $Q_8$ is a pulse delayed by $11.25 \times 8 = 90°$ relative to the pulse of the D input end. On the other hand, by the closing of the main switch, the VCO 5 starts to operate and therefore, the pulse from the VCO 5 is input to the frequency dividing circuit 19, which thus outputs a pulse obtained by dividing the pulse of the VCO 5 into 32 and applies this pulse to the electrode 1-1 through the amplifier 7 and the coil 10.

On the other hand, as described above, from the multiplexer 21, the pulse of the output end $Q_8$ of the register 20, i.e., a pulse 90° which is out of phase with respect to the pulse of the frequency dividing circuit 19, is applied to the electrode 1-2 through the amplifier 8 and the coil 11. By the actions of the coils 10 and 11 and the electrodes 1-1, 1-2 and 1-4, each of said pulses is applied to the electrodes 1-1 and 1-2 as a sine wave which is 90° out of phase, whereby a travelling vibration wave is generated on the surface of the stator 1, and a moving member which is in frictional contact with the surface of the stator is rotated and the SSM is operated. The wave forms of the electrodes 1-1 and 1-2 are converted to pulses by the comparators 16 and 17, and the pulse of the comparator 16 is applied to the S input end of the comparator 24.

On the other hand, the pulse of the comparator 17 is transmitted to the D input end of the register 25, and since this register is operating with the pulse of the VCO 5 as a clock, the output of the comparator 17, i.e., a pulse delayed in phase by 90° relative to the wave form of the electrode 1-1, is output from the output end $Q_8$, and it is input to the R input end of the comparator 24. Assuming that the wave form of the electrode 1-2 is delayed by 90° relative to the wave form of the electrode 1-1, the pulse from the output end $Q_8$ of the register 25 is delayed by 90° relative to the wave form of the electrode 1-1 and therefore, pulses of the same phase are input to the R and S input ends of the comparator 24. Consequently, in this state, the SSM continues to be driven with the pulse from the output end $Q_8$ of the register 20 remaining selected.

During said driving, even in a state wherein with the output end $Q_8$ of the register 20 selected, pulses which are 90° out of phase with each other are input to the amplifiers 7 and 8, if the driving wave forms to the electrodes 1-1 and 1-2 do not keep a 90° phase difference relation, the direction of count of the counter 22 is determined in conformity with the direction of phase shift relative to the 90° phase difference relation. That is, when the phase difference between the wave forms of the electrodes 1-1 and 1-2 is within 90°, i.e., in the phase relation shown in FIG. 9(a) and by dotted line in FIG. 9(b), the counter 22 is counted up by one in the manner described above, whereby the multiplexer 21 changes over the output end of the register from $Q_8$ to $Q_9$. The pulse of the output end $Q_9$ is a pulse having a phase delayed by 11.25° relative to the pulse of the output end $Q_8$ and therefore, the phase difference of the pulse applied to the amplifier 8 relative to the pulse applied to the amplifier 7 shifts from 90° to 101.25°. Consequently, the phase of the wave form applied to the electrode 1-2 is delayed, and the phase difference between the wave forms applied to the electrodes 1-1 and 1-2 is shifted toward 90°. Conversely, if the phase difference between the wave forms applied to the electrodes 1-1 and 1-2 is 90° or more in a state wherein the phase difference between the pulses applied to the amplifiers 7 and 8 keeps 90°, the counter 22 is counted down by one. Thereby the multiplexer 21 changes over the output end of the register 20 to $Q_8$ and selects the output end $Q_7$ Consequently, the phase difference of the pulse applied to the amplifier 8 relative to the pulse applied to the amplifier 7 becomes 78.75° which is advanced by 11.25° relative to 90° and the wave form applied to the electrode 1-2 is also more advanced, and the phase difference between the wave forms of the electrodes 1-1 and 1-2 is shifted toward 90°.

In the manner described above, the phase difference relation between the wave forms applied to the electrodes 1-1 and 1-2 is controlled so as to be always 90°. Control is effected so that the phase difference between the wave forms in the electrodes 1-1 and 1-2 is kept constant by the above-described operation and also, in the present embodiment, frequency control is effected so that the SSM is always driven by a resonance frequency.

Such frequency control operation will be described hereinafter.

To drive the SSM by a resonance frequency, the phase difference relation between the driving voltage wave form in the driving electrode 1-1 or 1-2 and the monitor wave form representative of the driving condition of the SSM in the monitor electrode 1-3 may be always held in a predetermined relation. That is, if the wave form relation between the electrodes 1-1 and 1-3 is also kept in the same phase difference relation as the positional relation in conformity with the positional relation between the driving electrode 1-1 and the monitor electrode 1-3, the SSM will be driven in a resonant condition. The electrode 1-1 and the electrode 1-3 are disposed 90° out of phase with each other and therefore, if control is effected so that the wave forms of the electrodes 1-1 and 1-3 are also 90° out of phase with each other, resonance driving can be accomplished.

As described above, the output of the output end $Q_8$ of the register 25 is a pulse delayed by 90° in phase relative to the wave form of the electrode 1-1 as shown in FIG. 9(c). This pulse is inverted by the inverter 18 and is transmitted to the S input end of the comparator 12 as the pulse of FIG. 9(e), i.e., a pulse advanced by 90° relative to the wave form of the electrode 1-1.

On the other hand, the wave form of the electrode 1-3 is converted to a pulse by the comparator 2 and then transmitted to the R input end of the comparator 12. If, as described above, the rising signal of the pulse to the R input end of the comparator 12 is produced earlier than the rising signal of the pulse to the S input end, the output of the comparator 12 which corresponds to the difference between said rising signals becomes H, and conversely, if the rising signal to the S input end is produced earlier than the rising signal to the R input end, the output of the comparator which corresponds to the difference between the rising signals becomes L, and further, if the rising signals to the R and S input ends are input simultaneously, the comparator 12 assumes an open state. Consequently, when the phase of the pulse of the comparator 2, i.e., the wave form from the electrode 1-3, becomes advanced relative to the phase of the pulse from the inverter 18, that is, when the phase difference between the wave forms of the electrodes 1-1 and 1-3 becomes 90° or more, the output of the comparator 12 corresponding to the period of that phase difference becomes H level, and this H level is input to the VCO 5 through the low-pass filter 4 to increase the input voltage to the VCO 5, and the oscillation frequency of the VCO 5 becomes correspondingly higher. The signal input to the electrode 1-1 has such a characteristic that it varies in a direction in which the phase thereof advances relative to the signal produced in the electrode 1-3 as the oscillation frequency of the VCO 5, i.e., the driving frequency to the electrodes 1-1 and 1-2, becomes higher, and therefore, the phase difference between the electrodes 1-1 and 1-3 is controlled toward 90°.

Conversely, when the phase difference between the electrodes 1-1 and 1-3 is within 90°, the rising signal to the S input end of the comparator 12 is produced earlier than the rising signal to the R input end and therefore, the output of the comparator 12 which corresponds to the phase difference therebetween becomes L and the oscillation frequency of the VCO 5 is reduced and thus, the driving frequency to the electrodes 1-1 and 1-2 also becomes lower, and the phases of the wave forms of the electrodes 1-1 and 1-3 increase and the phase difference between the electrodes 1-1 and 1-3 shifts toward 90°.

Figure 10B:
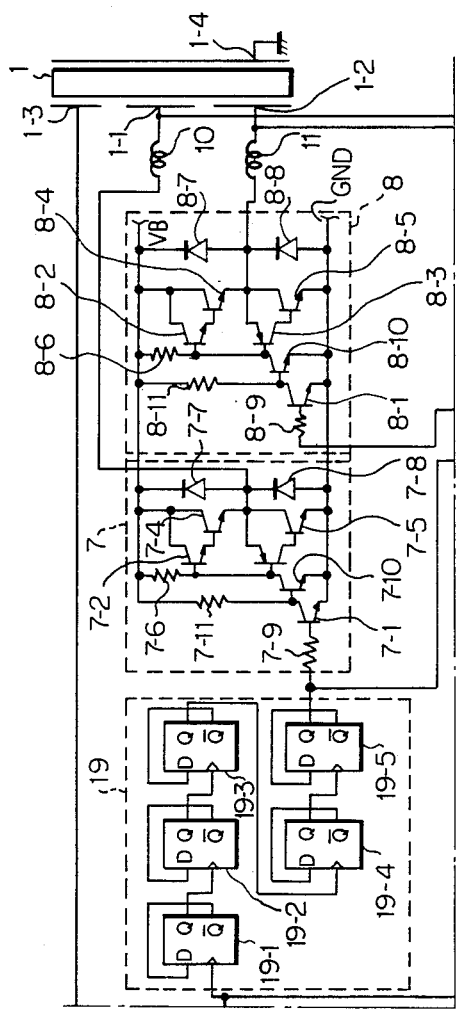
FIG. 10, consisting of FIGS. 10A, B and C, is a circuit diagram showing a specific circuit construction of the embodiment of FIG. 4.
Figure 10C:
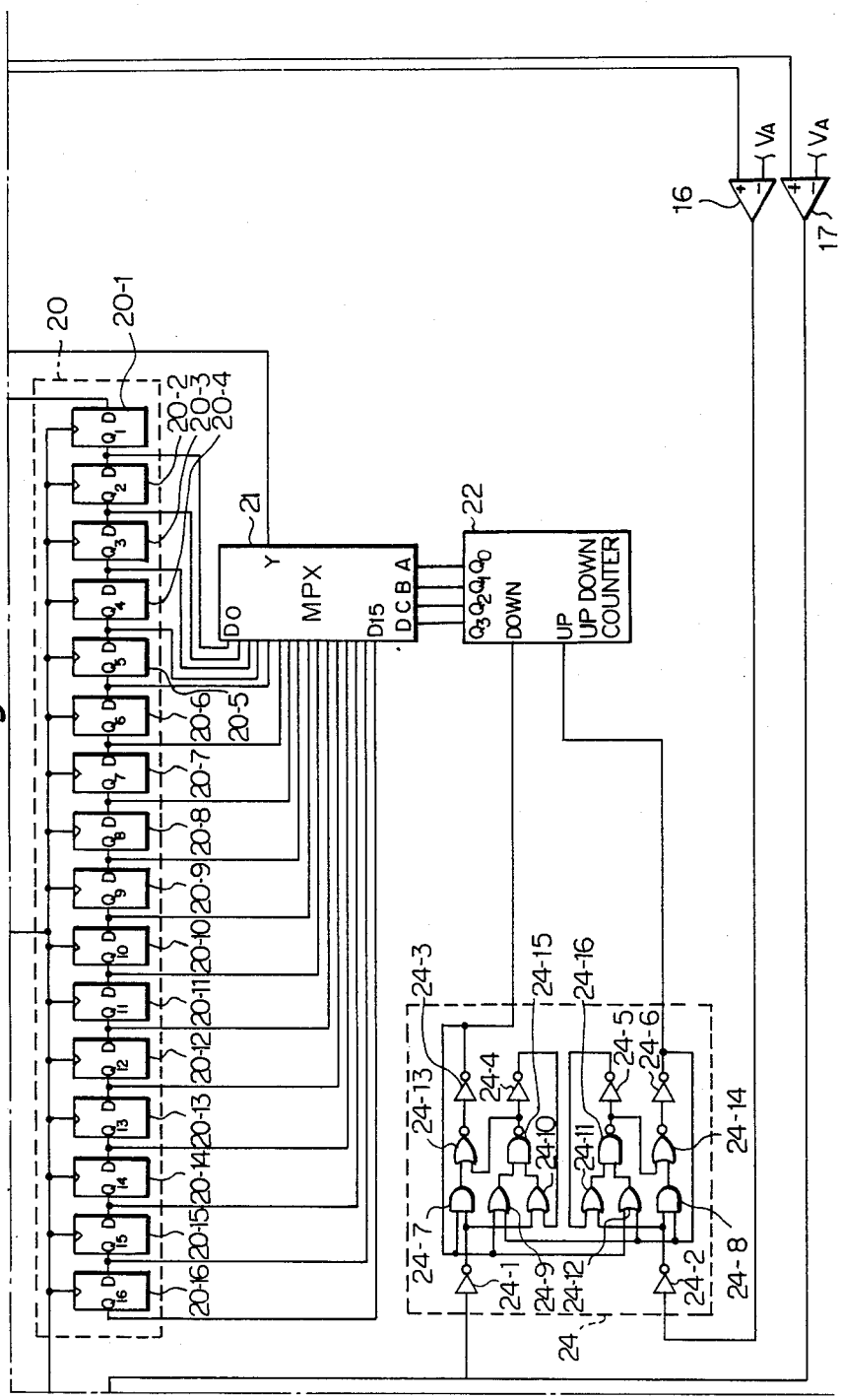

In this manner, detection of the phase difference between the wave forms of the electrodes 1-1 and 1-3 is done and the driving frequency of the SSM is controlled so that said phase difference is always 90° and thus, the SSM is always drivingly controlled in its resonant state. FIG. 10 is a circuit diagram showing a specific construction of the SSM shown in FIG. 4, and in FIG. 10, block portions identical to those in FIG. 4 are given identical reference numerals. In the phase comparator 12 shown in FIG. 10, reference numerals 12-1, 12-2, 12-13, 12-14, 12-15 and 12-16 designate inverters, reference numerals 12-3 and 12-8 denote AND gates, reference numerals 12-4, 12-5, 12-6 and 12-7 designate OR gates, reference numerals 12-9 and 12-12 denote NOR gates, reference numerals 12-10 and 12-11 designate NAND gates, reference numeral 12-7 denotes a P channel MOS FET, and reference numeral 12-18 designates an N channel MOS FET.

The comparator 12 itself is conventional and therefore need not be described in detail, but the input-output characteristics thereof are as described above in connection with FIG. 8, and it detects the phase difference of the rising signal of the input pulse and indicates the high, low and open states.

The low-pass filter 4 is comprised of resistors 4-1 and 4-2 and a capacitor 4-3. The resistor 4-1 is connected between the input and output of the low-pass filter 4, and the resistor 4-2 and the capacitor 4-3 are connected in series between the output and the ground (GND). In the VCO 5, reference numeral 5-1 designates an operational amplifier, reference numerals 5-2, 5-6, 5-7, 5-8 and 5-9 denote NPN type transistors, reference numerals 5-3, 5-4 and 5-5 designate PNP type transistors, reference numerals 5-10 and 5-16 denote resistors, reference numeral 5-11 designates a capacitor, reference numerals 5-14 and 5-15 denote NAND gates, and reference numeral 5-17 designates a constant current source. The input of the VCO 5 is the $\oplus$ input of the operational amplifier 5-1, and the $\ominus$ input of the amplifier 5-1 is connected to the emitter of the transistor 5-2 and one end of the resistor 5-10, and the other end of the resistor 5-10 is connected to GND. The operational amplifier 5-1, the transistor 5-2 and the resistor 5-10 together constitute a voltage-to-current converting circuit which causes a current corresponding to the voltage input to the amplifier 5-1 to flow to the collector of the transistor 5-2.

The collector of the transistor 5-2 is connected to the collector and base of the transistor 5-3, to the bases of the transistors 5-4 and 5-5 and further to the constant current source 5-17, and the transistors 5-3, 5-4 and 5-5 together constitute a current mirror circuit.

Also, the collector of the transistor 5-4 is connected to the collectors of the transistors 5-6 and 5-7 and to the bases of the transistors 5-7, 5-8 and 5-9. The collector of the transistor 5-5 is connected to the collectors of the transistors 5-8 and 5-9, to the $\ominus$ input and $\oplus$ input, respectively, of the comparators 5-12 and 5-13, and further to the capacitor 5-11. A reference voltage V1 is applied to the ⊕ input of the comparator 5-12, a reference voltage V2 (V1>V2) is applied to the ⊖ input of the comparator 5-13, the output of the comparator 12 is connected to one input of the NAND gate 5-14, and the output of the NAND gate 5-15 is connected to the other input of the gate 5-14. The output of the comparator 5-13 is connected to one input of the NAND gate 5-15, and the output of the gate 5-14 is connected to the other input of the gate 5-15.

The gates 5-14 and 5-15 together constitute a flip-flop, and the output of the gate 5-15 of the flip-flop is applied to the base of the transistor 5-6 through the resistor 5-16.

In the frequency dividing circuit 19, reference numerals 19-1 to 19-5 designate D type flip-flops, which together constitute a 32-frequency dividing circuit for the input pulse from the VCO 5. In the amplifier 7, reference numerals 7-1, 7-10, 7-2, 7-4 and 7-5 denote NPN type transistors, reference numeral 7-3 designates a PNP type transistor, and reference numerals 7-7 and 7-8 denote diodes. The amplifier 8 is of the same construction as the amplifier 7.

In the shift registers 20 and 25, reference numerals 20-1 to 20-16 and 25-1 to 25-8 designate D type flip-flops having their clock terminals connected to the output of the VCO 5 and having their front stage output terminals connected to the rear stage D input terminals.

In the phase comparator 24, reference numerals 24-1, 24-2, 24-3, 24-4, 24-5 and 24-6 designate inverters, reference numerals 24-7 and 24-8 denote AND gates, reference numerals 24-9, 24-10, 24-11 and 24-12 designate OR gates, reference numerals 24-13 and 24-14 denote NOR gates, and reference numerals 24-15 and 24-16 designate NAND gates.

The operation of the circuit of FIG. 10 is as described in connection with FIG. 4 and therefore need not be described, but the operations of the filter 4 and VCO 5 will hereinafter be described supplementally.

The capacitor 4-3 of the filter 4 is connected to the output of the comparator 12 and therefore, it is more charged and assumes a higher potential as the period of time during which H is output from the comparator 12 becomes longer, and is more discharged and assumes a lower potential as the period of time during which L is output becomes longer. When the output of the comparator 12 is in its open state, the potential of the capacitor 4-3 remains as it is.

That is, the filter 4 smoothes the output of the comparator 12 and as a result, an output corresponding to the output condition of the comparator 12 is produced in the capacitor 4-3.

More particularly, when the phase difference to the R and S inputs of the comparator 12 is zero as previously described, that is, the phase difference between the electrode 1-1 and the electrode 1-3 is 90°, the output of the comparator 12 is in its open state and therefore, the potential of the capacitor 4-3 of the low-pass filter 4 remains as it is, but when the wave form of the electrode 1-3 becomes more advanced in phase than 90° relative to the wave form of the electrode 1-1, a high signal of a duty corresponding to that phase difference is delivered from the output of the comparator 12 as described above, and the voltage of the capacitor 4-3 of the filter 4 increases. Conversely, when the wave form of the electrode 1-3 relative to the wave form of the electrode 1-1 becomes less advanced in phase than 90°, the output of the comparator 12 becomes a low signal (ground level) of a duty corresponding to that phase difference, and the charging potential of the capacitor 4-3 is reduced in conformity with the duty.

That is, the filter 4 has the function of converting the output condition of the comparator 12 to a voltage and then transmitting it to the VCO.

Since the output of the filter 4 is input to the amplifier 5-1 of the VCO, a current corresponding to the output voltage of the filter 4 flows to the resistor 5-10 and this current is formed at the collector terminal of the transistor 5-2. That is, the amplifier 5-1, resistor 5-10 and transistor 5-2 together form a voltage-current converting circuit for converting the filter output to a current. More particularly, assuming that the output of the filter 4 is V, this voltage V is applied to the resistor 5-10 and therefore, if the resistance value of the resistor 5-10 is R, a current $i_1 = V/R$ flows, and this current is formed at the collector terminal of the transistor 5-2. Also, if the constant current of the constant current source 5-17 is $i_2$, the composite current I of $i_2$ and $i_1$ is supplied from the transistor 5-3, and when the current mirror circuit is thus constructed, the currents of the transistors 5-4 and 5-5 also become said I.

Let it be assumed that the transistor 5-6 is OFF and the capacitor 5-11 is in its charged state.

In this state, all the current flowing to the transistor 5-4 flows to the transistor 5-7 and therefore, the same current as the value of the current flowing to the transistor 5-7 also flows to the transistors 5-8 and 5-9 which together constitute the current mirror circuit with the transistor 5-7. As a result, the value of the current flowing to the transistor 5-5 becomes the same as the value of the current flowing to the transistors 5-8 and 5-9 and therefore, a current corresponding to the value of the current flowing to the transistor 5-5 flows out from the capacitor 5-11, and the capacitor 5-11 is discharged at the value of the current flowing to the transistor 5-5, i.e., said I.

Thereby the potential of the capacitor 5-11 is reduced and when it assumes the reference level $V_2$ or less, the output of the comparator 5-13 becomes L and the output of the NAND gate 5-15 constituting a flip-flop becomes H. Therefore, the transistor 5-6 is rendered conductive. By the transistor 5-6 becoming conductive, all the current flowing to the transistor 5-4 flows to the ground and at the same time, the transistors 5-7, 5-8 and 5-9 become non-conductive. In this case, at the value of the current flowing to the transistor 5-5, i.e., said I, the capacitor 5-11 is charged with a constant current and the potential of the capacitor 5-11 rises and reaches the reference level $V_1$. Thereby the comparator 5-12 is inverted and renders the output thereof L and therefore renders the output of the NAND gate 5-15 into L and again renders the transistor 5-6 non-conductive. Thereafter said discharge is again effected, whereafter said charging and discharging are repetitively executed.

As described above, charging and discharging of the capacitor 5-11 are executed at the value I of the current of the transistor 5-4 and this value I of the current is determined in conformity with the capacitor 4-3 of the filter, i.e., the output condition of the comparator 12 and thus, the speeds of said charging and discharging are determined in conformity with the phase difference between the wave forms of the electrodes 1-1 and 1-3.

More particularly, when the wave form of the electrode 1-3 is advanced by 90° in phase relative to the wave form of the electrode 1-1, the output of the comparator 12 is in its open state and therefore the potential of the capacitor 4-3 is held constant and thus, said value I of the current is constant. Consequently, in this case, the charging operation for the capacitor 5-11 is at a constant speed and the output of the NAND gate 5-14 constituting a flip-flop is also inverted at the constant speed and therefore, the frequency of the output pulse of the flip-flop is held constant and in this state, the SSM is drivingly held at a constant resonance frequency.

If the phase advance of the wave form of the electrode 1-3 relative to the wave form of the electrode 1-1 becomes greater than 90° for some reason or other, the output of the comparator 12 becomes high and the period of time during which said output is high becomes longer as the phase difference becomes greater and therefore, the capacitor 4-3 is charged and the potential thereof becomes higher as the phase difference becomes greater. Consequently, the value I of the current also becomes greater and therefore, the output frequency of said flip-flop shifts toward an increase. Thereby the frequency of the driving wave form to the electrodes 1-1 and 1-2 is increased, and the driving wave form is restored to said resonance frequency and the phase difference between the wave forms of the electrodes 1-1 and 1-3 restores said phase difference of 90°.

Conversely, if the phase advance of the wave form of the electrode 1-3 relative to the wave form of the electrode 1-1 becomes less than 90°, the output of the comparator 12 becomes low and the period of time during which said output is low becomes longer as said phase difference becomes greater. Consequently, the amount of discharge of the capacitor comes to correspond to said phase difference and the potential of the capacitor 4-3 becomes lower as the phase difference becomes greater, and said value I of the current also becomes smaller and therefore, the output frequency of said flip-flop shifts toward a decrease. Thereby the driving frequency of the electrodes 1-1 and 1-2 is reduced and restores said resonant state, and the phase difference between the wave forms of the electrodes 1-1 and 1-3 assumes the 90° state.

Thus, the VCO determines its output pulse frequency in conformity with the potential of the capacitor 4-3 of the filter 4 and causes the driving frequency to the electrodes 1-1 and 1-2 to shift to the resonance frequency as described above.

Also, at the initial stage of the driving of the SSM, the potential of the capacitor 4-3 is zero and no current flows to the collector of the transistor 5-2, whereas in this case, charging and discharging of the capacitor 11 are effected at a constant current value controlled by the constant current source 5-17 and the SSM is driven.

As described above, in the present embodiment, the wave forms of the driving electrodes 1-1 and 1-2 are detected and the relative phase difference between the wave forms applied to the driving electrodes is controlled so as to be always constant (90°) and therefore, the driving wave forms can continue to be supplied to the driving electrodes always in a proper phase difference relation and the SSM can be driven properly. In the present embodiment, the coils 10 and 11 are disposed to convert the pulses as the driving wave forms into sine waves, but if the frequency characteristics of the amplifiers 7 and 8 are appropriately set, the coils 10 and 11 may be omitted. Also, the shift register 20 is a 32-frequency dividing circuit, but of course, more accurate control will be ensured if the number of frequency divisions is increased, and in such case, it will be necessary to set the frequency of the VCO 5 and the number of frequency divisions of the shift register 25 so that they are coincident with each other. Also, the wave forms of the electrodes 1-1 and 1-2 may be directly detected by the comparator and when the phase difference therebetween increases or decreases relative to 90°, the count value of the counter 22 may be counted up or down. In such case, the comparator used may be one which outputs OUT1 and OUT2 with the phase difference of 90° as the reference.

Further, in the present embodiment, the digital phase is controlled, but a phase shifter for analogously shifting the phase by 90° relative to the wave form applied to one electrode may be disposed, the output of this phase shifter may be applied to the other electrode and in that case, the phase difference between the wave forms of the electrodes may be detected and the shift of that phase difference relative to a predetermined relation may be detected by a comparing circuit so that the amount of phase shift by said phase shifter may be controlled by the detection output.

According to the embodiment of FIG. 4, signals of the phase difference of 90° are always applied to the electrodes 1-1 and 1-2, but in the above-described feedback control, there is an undesirable possibility that a phase difference of about 90° is repetitively applied, which may in turn cause irregularity of revolution. That is, the relation between the stator and the moving member which is in frictional contact with the stator is ideally uniform, but actually the positional relation between the moving member and the stator differs depending on the rotational position. Consequently, the electrical characteristic between the electrode 1-1 and the electrode 1-4 and the electrical characteristic between the electrode 1-2 and the electrode 1-4 vary in conformity with the rotational position of the moving member. In this manner, the characteristic between the electrode 1-1 and the electrode 1-4 and the characteristic between the electrode 1-2 and the electrode 1-4 differ from each other depending on the position of the moving member during its rotation relative to the stator and thus, according to the above-described feedback control method, the phase difference relation is always controlled in conformity with the change in the moving member.

FIG. 11 is a wave form diagram showing the phase difference relation between frequency voltages applied to the electrodes 1-1 and 1-2.

It is assumed that the electrical characteristics of the amplifiers 7 and 8 and the coils 10 and 11 are identical. In this case, when the rotational position of the moving member relative to the stator is at the same position due to the relations between the electrical characteristics of the electrodes 1-1 and 1-4 and the electrodes 1-2 and 1-4, if signals which are 90° out of phase with one another as indicated at ⓐ-ⓑ in FIG. 11 are applied to the amplifiers 7 and 8; frequency voltages which are 90° out of phase with each other are applied to the electrodes 1-1 and 1-2 in the meantime. On the other hand, when the rotational position of the moving member is at a different position due to the electrical characteristic between the electrodes 1-1 and 1-4 and the electrical characteristic between the electrodes 1-2 and 1-4, even if signals of the relations ⓐ-ⓑ in FIGS. 11(a) and (b) are applied as input signals to the amplifiers 7 and 8, frequency voltages which are 90° out of phase with each other will not be applied to the electrodes 1-1 and 1-2. Consequently, in this case, assuming that said feedback control is being effected, the control is effected so that the phase difference between the signals input to the amplifiers 7 and 8 is varied from 90° and as a result, the frequency voltages applied to the electrodes 1-1 and 1-2 during this period are shifted to a phase difference of 90°. That is, assuming that the phase of the applied voltage to the amplifier 8 is advanced by ΔT relative to the phase difference of 90° during the normal time relative to the applied voltage to the amplifier 7 by the feedback control conforming to the amount of shift of the phase difference relative to 90° between the electrodes 1-1 and 1-2 during the period (ⓗ-ⓘ FIG. 11) when the electrical characteristics between the electrodes 1-1 and 1-4 and between the electrodes 1-2 and 1-4 become different from each other depending on the position of the moving member, whereby the frequency voltages between the electrodes 1-1 and 1-2 can be kept in the 90° phase difference relation, the applied voltages to the amplifiers 7 and 8 during this period (ⓗ-ⓘ in FIG. 11) are such that the duty and period of the applied signal to the amplifier 8 during the period ⓐ-ⓗ are 50% and T, respectively, whereas the duty and period during the period ⓗ-ⓘ are $$\frac{\frac{T}{2}}{T - \Delta T}$$

and T−ΔT, respectively. When said feedback control is effected in this manner, signals different in duty and period are repetitively supplied to the amplifier 8 from moment to moment by the rotation of the moving member, whereby signals different in level and frequency are applied to the electrode 1-2 from moment to moment, thereby causing irregularity of revolution of the SSM.

Figure 12:
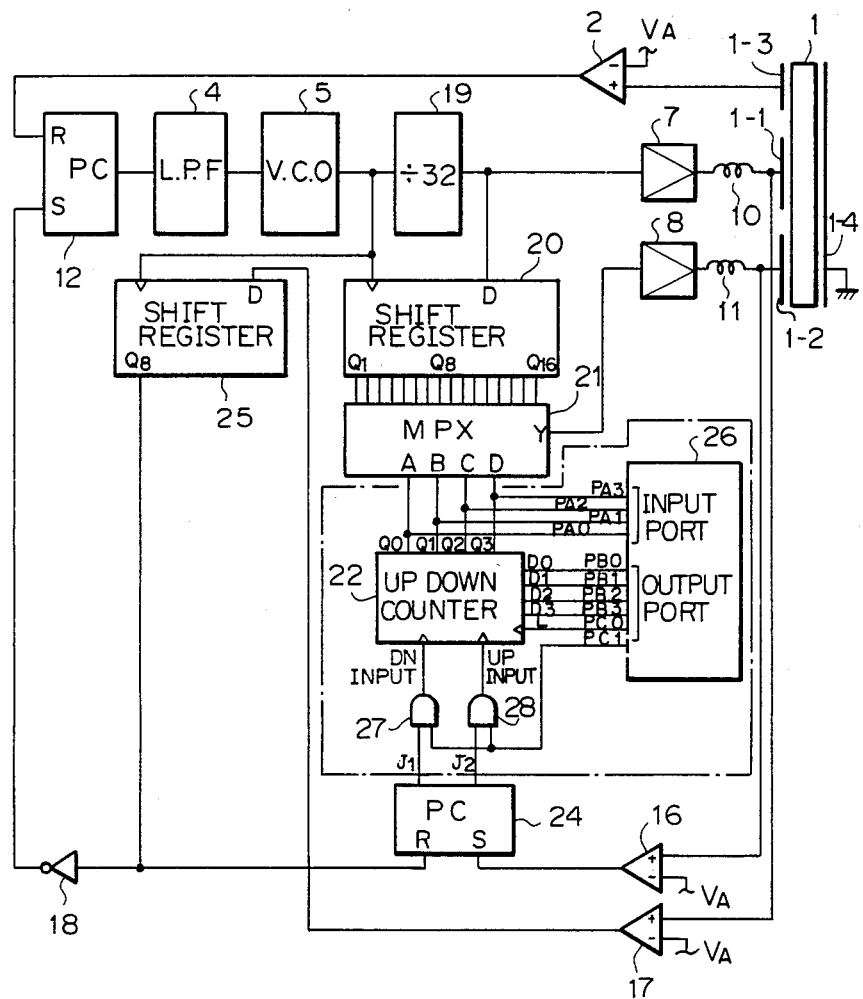
FIG. 12 is a block diagram showing another embodiment of the present invention.

FIG. 12 is a circuit diagram of an embodiment in which such irregular revolution is prevented. In the embodiment of FIG. 12, components similar to those in the embodiment of FIG. 4 are given similar reference numerals.

This embodiment differs from the embodiment of FIG. 4 in that the outputs $J_1$ and $J_2$ of a comparator 24 are connected to the up input and down input, respectively, of an up-down counter 22 through AND gates 27 and 28 and that a microprocessor 26 is provided. The comparator 24 is the same as the comparator of FIG. 4, and the output ends OUT1 and OUT2 in FIG. 4 correspond to $J_1$ and $J_2$, respectively.

Also, the input ports $PA_0$–$PA_3$ of the microprocessor 26 are connected to the output ends $Q_0$–$Q_3$ of the counter 22, the output ports $PB_0$–$PB_3$ of the microprocessor 26 are connected to the data input terminals $D_0$–$D_3$ of the counter 22, and the counter 22 outputs to the output ends $Q_0$–$Q_3$ the data input through the data input terminals $D_0$–$D_3$. The output port $PC_0$ of the microprocessor 26 is connected to the latch input end L of the counter 22, and by the signal from the output port $PC_0$, the counter 22 introduces thereinto the input signals to the data input ends $D_0$–$D_3$. The output port $PC_1$ of the microprocessor 26 is connected to the input end of one of the AND gates 27 and 28, and the signal from the output port $PC_1$ inhibits the input to the up-down input end.

Operation of the FIG. 12 embodiment will now be described.

Figure 13:
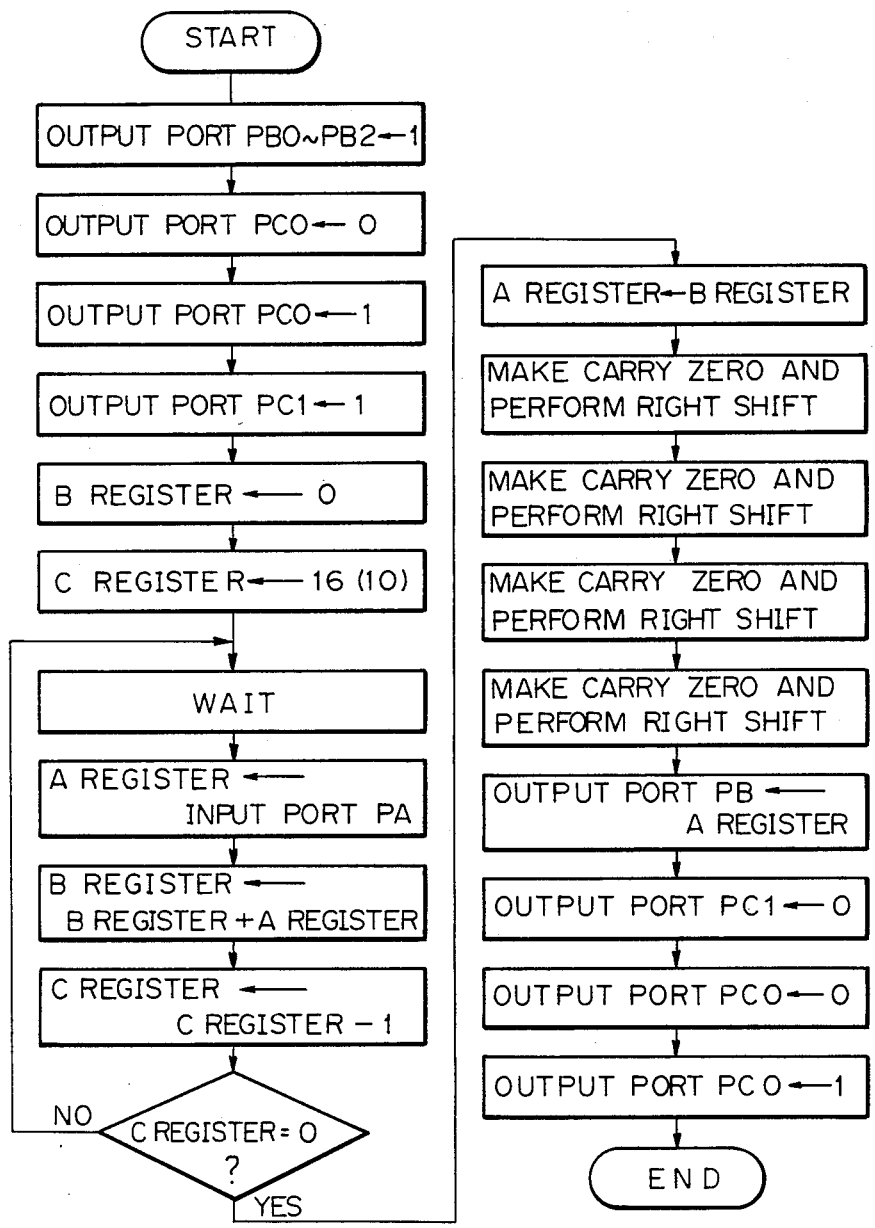
FIG. 13 is a program chart showing the operation of a processor 26 shown in FIG. 12.

By a main switch, not shown, being closed, the microprocessor 26 is operated and the program shown in FIG. 13 is executed. In this program, 1 is first output to the output ports $PB_0$–$PB_2$ and 0 is output to the output port $PB_3$, and then 0 is output to the output port $PC_0$, whereafter 1 is delivered to the output port $PC_0$. Thereby a signal representative of a change 0→1 is input to the latch terminal L of the counter, and the counter latches the signals input to the data input terminals $D_0$–$D_3$. Thereby, "0,1,1,1" is set as the initial value in the counter 22. In this state, the multiplexer 21 selects the output end $Q_8$ of the register 20. As described above, the output ends $Q_1$–$Q_8$ of the register 20 output signals which are out of phase by 11.25° each relative to the D input signal thereof and therefore, by the output end $Q_8$ being selected, a pulse delayed by $11.25 \times 8 = 90°$ relative to the pulse of the D input end is selected.

Also, the microprocessor 26 outputs 1 from its output port $PC_1$ to render the AND gates 27 and 28 open, and further inputs 1 to the B register therein to reset the B register, and thereafter inputs 16 to the C register therein. After said steps have been executed, the microprocessor 26 assumes a standby state for a predetermined time (200 μ sec.).

On the other hand, the VCO 5 starts to operate upon closing of the main switch and therefore, the pulse from the VCO 5 is input to the frequency dividing circuit 19, which thus outputs a pulse obtained by dividing the pulse of the VCO 5 into 32, and applies this pulse to the electrode 1-1 through the amplifier 7 and the coil 10.

On the other hand, as described above, from the multiplexer 21, a pulse which is 90° out of phase relative to the pulse of the output end $Q_8$ of the register 20, i.e., the pulse of the frequency dividing circuit 19, is applied to the electrode 1-2 through the amplifier 8 and the coil 11. By the actions of the coils 10 and 11 and the electrodes 1-1, 1-2 and 1-4, said pulses are applied to the electrodes 1-1 and 1-2 as sine waves which are 90° out of phase with each other, whereby a travelling vibration wave is generated in the surface of the stator 1 and thus, the moving member which is in frictional contact with the surface of the stator is rotated, whereby the SSM is operated. The wave forms of the electrodes 1-1 and 1-2 are converted into pulses by comparators 16 and 17, respectively, and the pulse of the comparator 16 is applied to the S input end of the comparator 24.

On the other hand, the pulse of the comparator 17 is transmitted to the D input end of the register 25, and this register is operating with the pulse of the VCO 5 as a clock and therefore, from the output end $Q_8$, the output of the comparator 17, i.e., a pulse delayed by 90° in phase relative to the wave form of the electrode 1-1, is output, and it is input to the R input end of the comparator 24. Assuming that the wave form of the electrode 1-2 is delayed by 90° relative to the wave form of the electrode 1-1, the pulse from the output end $Q_8$ of the register 25 is delayed by 90° relative to the wave form of the electrode 1-1 and therefore, pulses of the same phase are input to the R and S input ends of the comparator 24. Consequently, in this state, the SSM continues to be driven with the pulse from the output end $Q_8$ of the register 20 remaining selected.

Even in a state wherein during said driving, pulses different by 90° in phase are input to the amplifiers 7 and 8 with the output end $Q_8$ of the register 20 being selected, if the driving wave forms to the electrodes 1-1 and 1-2 do not keep a 90° phase difference relation, the direction of count of the counter 22 is determined in conformity with the direction of phase shift relative to the 90° phase difference relation.

That is, when the phase difference between the wave forms of the electrodes 1-1 and 1-2 is within 90°, as in the embodiment of FIG. 4, the signal from the output end $J_2$ of the comparator 24 is transmitted to the up input through the AND gate 28 and the counter 22 is counted up by one, whereby the multiplexer 21 changes over the output end of the register from $Q_8$ to $Q_9$. Since the pulse of the output end $Q_9$ is a pulse having a phase delayed by 11.25° relative to the pulse of the output end $Q_8$, the phase difference of the pulse applied to the amplifier 8 relative to the pulse applied to the amplifier 7 shifts from 90° to 101.25°. Consequently, the phase of the wave form applied to the electrode 1-2 is delayed, and the phase difference between the wave forms applied to the electrodes 1-1 and 1-2 is shifted toward 90°. Conversely, when the phase difference between the pulses applied to the amplifiers 7 and 8 keeps 90° and the phase difference between the electrodes 1-1 and 1-2 is 90° or more, the counter 22 is counted down by one.

Thereby the multiplexer 21 is changed over to the output end $Q_8$ of the register 20 and selects the output end $Q_7$. Consequently, the phase difference of the pulse applied to the amplifier 8 relative to the pulse to the amplifier 7 becomes 78.75° which is advanced by 11.25° from 90°, and the wave form applied to the electrode 1-2 also becomes advanced and the phase difference between the wave forms of the electrodes 1-1 and 1-2 is shifted toward 90°.

In the manner described above, the phase difference relation between the wave forms applied to the electrodes 1-1 and 1-2 is controlled so as to be always 90°.

Assuming that as described above, the electrical characteristic between the electrode 1-1 and the electrode 1-4 and the electrical characteristic between the electrode 1-2 and the electrode 1-4 change in conformity with the rotational position of the moving member, the above-described 90° phase difference control operation is continuously and repetitively executed with a short period. Consequently, as described above in connection with FIG. 11, the pulse applied to the amplifier 8 becomes different in duty and period from moment to moment and the voltage applied to the electrode 1-2 also becomes different in level and frequency, and this may result in irregularity of revolution.

However, in the present embodiment, the above-described operation is performed for a predetermined time and the average phase difference pulse in the meantime is found, whereafter this calculated pulse is applied to the amplifier 8 to thereby solve the above-noted problem.

That is, in the process during which the 90° phase difference control is effected as described above, the microprocessor 26 detects the count value of the counter 22 sixteen times during each predetermined period (200 $\mu$sec.) and finds the average value of the count values in the meantime.

More particularly, the microprocessor 26 waits for said 200 $\mu$sec., whereafter it inputs to the accumulator (A register) therein the data input to the input ports $PA_0$–$PA_3$, i.e., the count value of the counter 22, adds the content of the B register to the content of the A register, inputs the addition value to the B register, further substracts 1 from the content of the C register and repeats the above-described operation until the result of the subtraction becomes zero.

As described above, 16 is set as the initial value in the C register and therefore, the above-described operation is executed 16 times, whereby the total sum of the contents of the counter 22 during each 200 $\mu$sec. is recorded in the B register. As described above, the content of the counter 22 is a value representative of the pulse phase to the amplifier 8 which changes from moment to moment depending on the rotational position of the moving member during said 90° phase difference control and therefore, to the B register, it is the total sum of the pulse phases applied to the amplifier 8 which change for the 90° phase difference control.

Thereafter, the microprocessor 26 inputs said total sum value of the B register to the A register and effects the rightward shift of the A register four times. Thereby a value divided by 16 relative to the content of the A register is obtained, and said total sum/16 is effected, whereby the average value of the content of the counter 22 during said 90° phase difference control is found.

Thereafter the microprocessor 26 delivers the content of the A register to the output ports $PB_0$–$PB_3$, whereafter it renders the output of the output port PC1 into 0 and renders the gates 27 and 28 closed, thereby inhibiting the inputting of the output of the comparator 24 to the counter 22 thereafter. After the above-described operation, the microprocessor 26 renders the output of the output port $PC_0$ into 0 and then into 1, transmits a latch signal to the counter, and latches the data delivered to the output ports $PB_0$–$PB_3$, i.e., the aforementioned average value, into the counter 22.

Thereby a count value determining the pulse corresponding to the average value of the applied pulse to the amplifier 8 during said 90° phase difference control (the pulse which is in a predetermined phase difference relation to the pulse to the amplifier 7) is fixed in the counter 22, whereafter a pulse having the phase difference relation of this average value continues to be applied to the amplifier 8. In this manner, in the present embodiment, the pulse to the amplifier 8 is controlled by said 90° phase difference control so as to be of the average value of the pulse of the changing phase difference relation, whereafter this pulse is applied to the amplifier 8 and therefore, wave forms substantially keeping 90° can be selected as the applied wave forms to the electrodes 1-1 and 1-2 and the aforementioned irregular revolution can be prevented.

Control of the phase difference between the wave forms in the electrodes 1-1 and 1-2 is accomplished by the above-described operation, and in the present embodiment, frequency control is effected so that the SSM is driven always at a resonance frequency. This frequency control is the same as that in the embodiment of FIG. 4 and therefore need not be described.

Figure 14C:
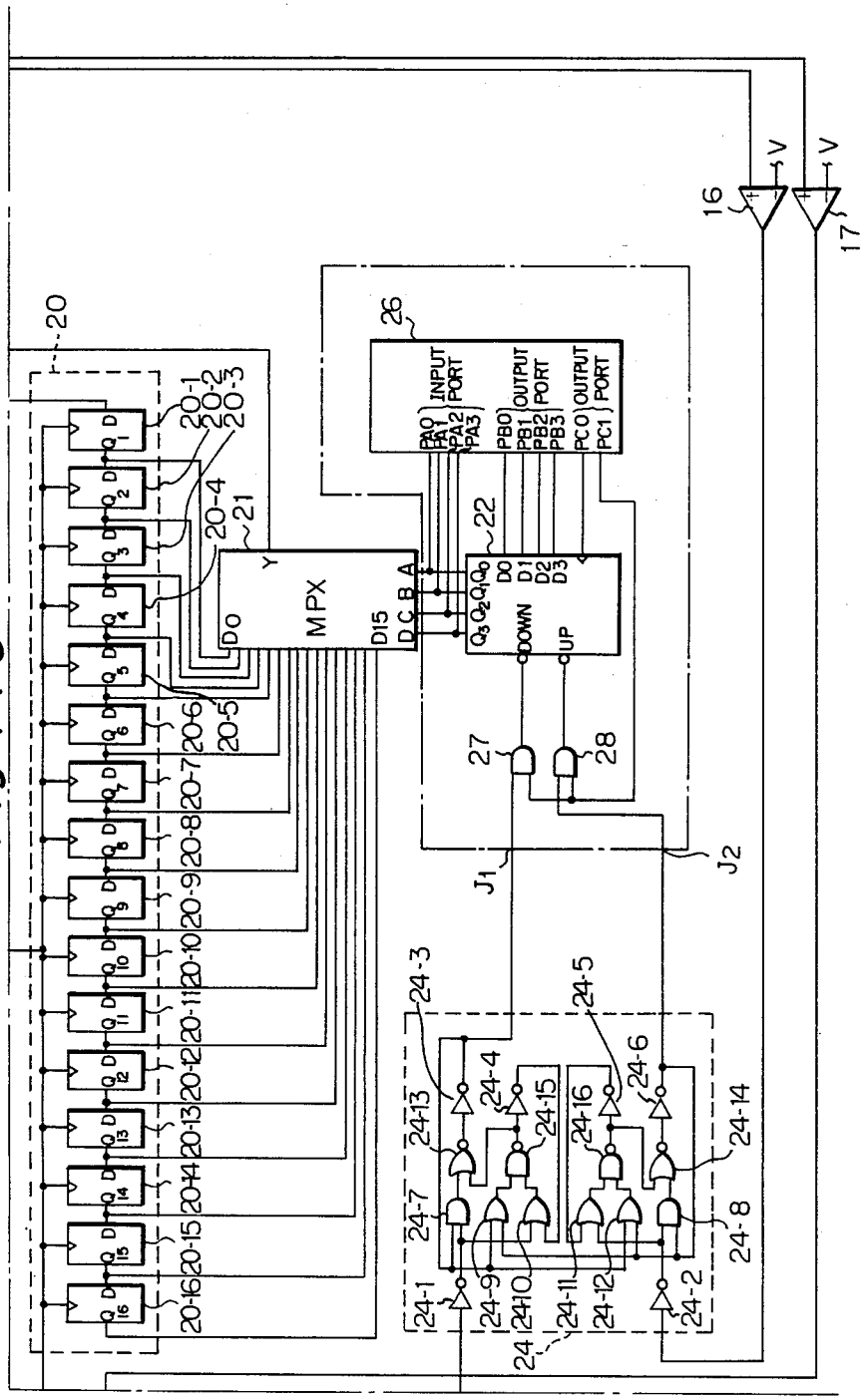
FIG. 14, consisting of FIGS. 14A, B and C, is a circuit diagram showing a specific construction of the embodiment of FIG. 12.

FIG. 14 is a circuit diagram showing a specific construction of the SSM shown in FIG. 12.

In FIG. 14, block portions identical to those in FIG. 12 are given identical reference numerals. The construction of FIG. 14 is substantially the same as that of FIG. 10 and therefore need not be described.

Figure 15A:
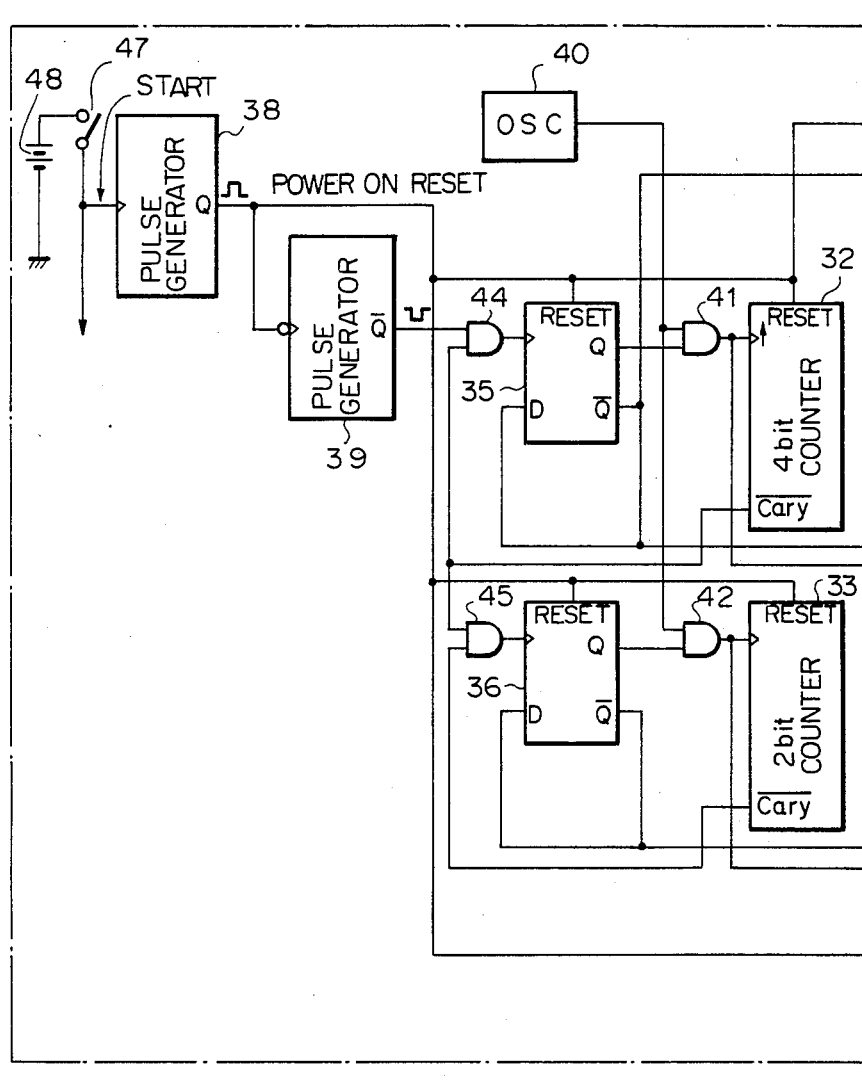
FIG. 15, consisting of FIGS. 15A and B, is a circuit diagram showing another embodiment of the driving circuit according to the present invention.
Figure 15B:
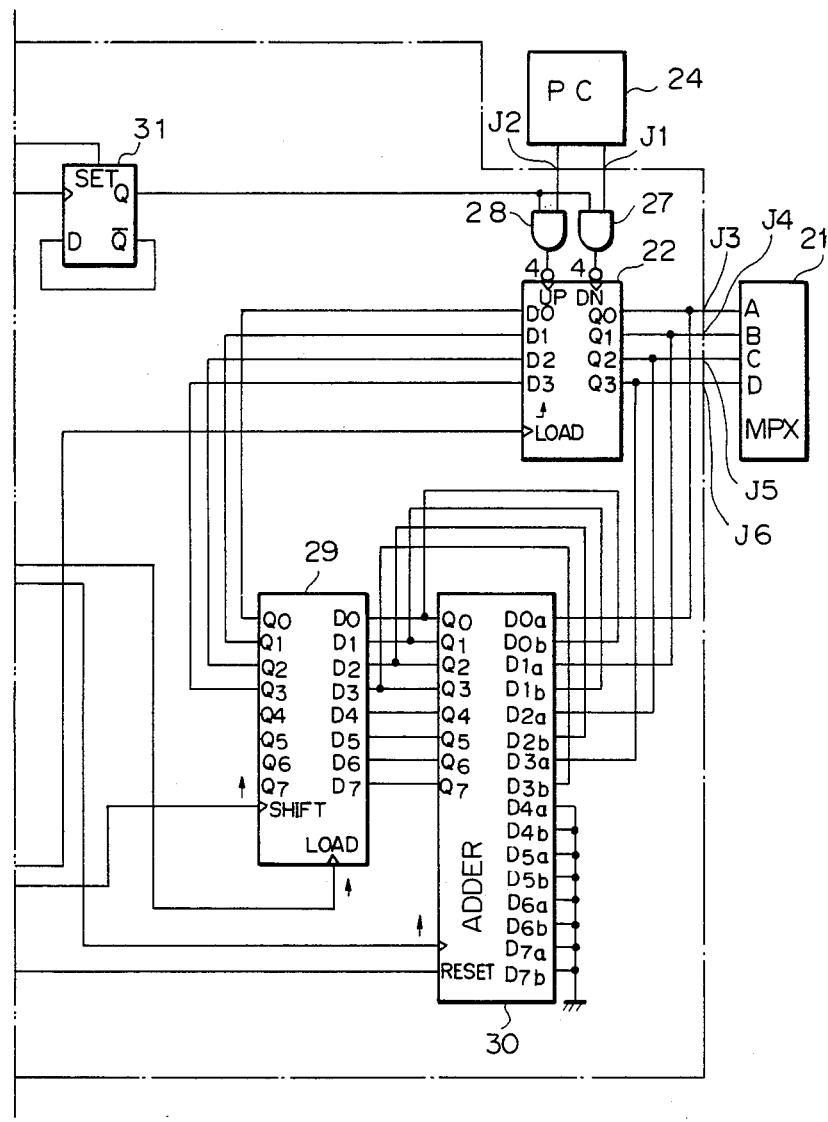

FIG. 15 shows an embodiment in which the circuit indicated by the dot-and-dash line in the embodiment of FIG. 12 is constituted by a hard circuit instead of a microprocessor. This circuit replaces the circuit encircled by the dot-and-dash line in the embodiment of FIG. 12.

In FIG. 15, reference numeral 22 designates an up-down counter having its up and down terminals UP and DN connected to the outputs of AND gates 28 and 27, respectively. The up-down counter 22 effects up or down count by the rising signal to said terminals. Also, the counter 22 has a load terminal LOAD, and loads the input signals to data terminals $D_0$–$D_3$ by the rising signal to said load terminal and outputs them to output ends $Q_0$–$Q_3$.

Reference numeral 30 denotes an adder which adds the input signals to input terminals $D_{0a}$–$D_{3a}$ and $D_{0b}$–$D_{3b}$ in a binary from by the rising signal to a clock terminal.

The adder 30 is provided with a reset terminal RESET and renders outputs $Q_0$–$Q_7$L by the inputting of an H signal to this terminal.

The inputs $D_{0a}$–$D_{3a}$ of the adder 30 are connected to the output ends $Q_0$–$Q_3$ of the counter 22, the outputs $Q_0$–$Q_3$ of the adder 30 are fed back to the inputs $D_{0b}$–$D_{3b}$, and the adder 30 adds the data input to the inputs $D_{0a}$–$D_{3a}$ in succession.

Reference numeral 29 designates a shift register to which is input the data input to data terminals $D_0$–$D_7$ by the inputting of a rising signal to the load terminal LOAD. The shifting operation of this register is performed each time a rising signal is input to a shift terminal SHIFT.

Reference numeral 32 denotes a 4-bit binary up counter, and the whole output thereof becomes L when H is input to a reset terminal REST.

Also, when a rising clock is input to the clock input of the counter 32, a count-up operation is performed.

The carry output $\overline{\text{Carry}}$ of this counter outputs L when the count value of the counter is "15" which is the final value, and outputs H when the count value is any other value.

Reference numeral 33 designates a 2-bit up counter. This counter is such that its carry output $\overline{\text{Carry}}$ is L when the count value thereof is "3" and that the carry output outputs H when the count value thereof is any other value.

Reference numeral 31 denotes a flip-flop having a set input, and reference numerals 35 and 36 designate flip-flops each having a reset input. Reference numerals 41, 42, 44 and 45 denote AND gates.

Reference numeral 38 designates a pulse generating circuit adapted to be triggered by the rising of an input signal. The pulse generating circuit 38 outputs H to the Q output for a predetermined time. Reference numeral 39 also denotes a pulse generating circuit adapted to be triggered by the falling signal of the input thereto. This pulse generating circuit 39 outputs L to the $\overline{Q}$ output for a predetermined time.

Reference numeral 48 designates a DC power source, reference numeral 47 denotes a main switch, and reference numeral 40 designates an oscillator which oscillates, for example, at 1 KHz.

Operation of the circuit shown in FIG. 15 will now be described.

First, when the switch 47 is closed, an electric power is supplied to the entire circuit and at the same time, the pulse generating circuit 38 for outputting a power-on reset signal is triggered. The Q output of the circuit 38 outputs H for a predetermined time.

Thereby the Q output of the flip-flop 31 becomes H to render the AND gates 28 and 27 open and render the signal from a phase comparator 24 capable of being input to the clock input of the up-down counter 22.

Also, the Q outputs of the flip-flops 35 and 36 become L and the clock inputs to the counters 32 and 33 are stopped while, at the same time, the counters 32 and 33 are all reset. (The internal state becomes "0".)

Further, the adder 30 is also reset, and all the outputs $Q_0$–$Q_7$ become L.

Thereafter, when the Q output of the pulse generating circuit 28 restores L, the pulse generating circuit 39 is operated by the falling signal and the $\overline{Q}$ output of the circuit 39 becomes L for a predetermined time (e.g. 20 msec.).

When the $\overline{Q}$ output of the pulse generating circuit 39 restores H after the lapse of said predetermined time, the then L→H rising signal is input to one input of the AND gate 44.

The other input of the AND gate 44 is connected to the carry output of the counter 32, and since the internal state of the counter 32 is reset to "0", H is output to the carry output thereof.

Accordingly, the $\overline{Q}$ output of the circuit 39 is intactly output from the AND gate 44 and is input to the clock input of the flip-flop 35. The flip-flop 35 has its output $\overline{Q}$ connected to the input D and constitutes a T-flip-flop, and by said output (rising signal) from the AND gate 44 being input to the clock input of the flip-flop 35, the Q output of the flip-flop 35 is inverted to H.

By the Q output of the flip-flop 35 becoming H, the clock signal from the oscillator 40 is intactly output to the output of the AND gate 41. The output of the AND gate 41 becomes the up count clock of the 4-bit up counter 32 and at the same time, becomes the addition clock of the adder 30.

On the other hand, the SSM has been operating after the closing of the main switch 47, and as described above in connection with FIG. 12, the 90° phase difference control operation of the applied voltages to the electrodes 1-1 and 1-2 is being effected. That is, a pulse is input to the counter 22 through the AND gates 28 and 27 opened by the closing of the main switch 47 so that the phase difference between the applied voltages to the electrodes 1-1 and 1-2 is held in the 90° relation, whereby the phase of the applied pulse to the amplifier 8 is normally controlled. Consequently, in this state, the count value of the counter 22 is normally varied as a result of the 90° phase difference control being effected as described above.

Also, as described above, the output pulse of the oscillator 40 is input to the adder 30 as the addition clock of the adder 30 and therefore, the adder 30 adds the output of the counter 22, i.e., the input signals to the inputs $D_{0a}$–$D_{3a}$ of the adder 30, and the outputs $Q_0$–$Q_3$ of the adder 30, i.e., the input signals to the inputs $D_{0b}$–$D_{3b}$ of the adder, in synchronism with said addition clock. Consequently, cumulative addition for the variation in the count value of the counter 22 by the 90° phase difference control is effected.

As soon as the cumulative addition by the adder 30 is thus effected, the pulse from the oscillator 40 is input to the counter 32 as described above and therefore, the counter 32 performs its counting operation and, when the count value thereof becomes 15, the carry output of the counter 32 outputs L and at the next input clock, the carry output becomes H. The carry output of the 4-bit counter 32 is connected to the clock input of the flip-flop 35 through the AND gate 44 and therefore, when the carry output of the 4-bit counter 32 changes from L to H, the output Q of the flip-flop 35 is inverted to L. Accordingly, the output of the oscillator 40 no longer passes through the AND gate 41, and the 4-bit counter 32 stops counting and at the same time, the adder 30 also stops adding. In the meantime, the number of clocks input to the addition clock of the adder 30 becomes sixteen and thus, the adder 30 has cumulatively added the count value of the counter 22 sixteen times.

On the other hand, the carry output of the 4-bit counter 32 becomes H, whereby as described above, the Q output of the flip-flop 35 becomes L and at the same, the $\overline{Q}$ output becomes H, whereupon the output Q of the flip-flop 31 is inverted to L because the rising signal of the $\overline{Q}$ output is connected to the clock of the flip-flop 31. Accordingly, the output signal from the phase comparator 24 no longer passes through the AND gates 27 and 28 and the up-down counter 22 stops its operation. At the same time, the shift register loads therein the output of the adder 30 which is outputting the result of the addition being effected sixteen times as described above, because the $\overline{Q}$ output of the flip-flop 35 is connected to the load terminal LOAD of the shift register 29.

Also, when the carry output of the 4-bit counter 32 changes from L to H as described above, this rising signal is input to the clock of the flip-flop 36 through the AND gate 45. Accordingly, the Q output of the flip-flop 36 is inverted to H, whereby it passes through the AND gate 42 and the clock from the oscillator 40 is input to the clock input of the 2-bit counter 33 and at the same time, is also input to the shift clock of the shift register 29. In the manner described above, the clock to the counter 33 starts inputting and the counter performs its counting operation and, when the count thereof becomes "3", the carry output of the counter 33 becomes L, and becomes H by the inputting of the next clock. This L→H signal change passes through the AND gate 45 and is input to the clock input of the flip-flop 36, and the Q output of the flip-flop 36 is inverted to L. Accordingly, the output of the oscillator 40 can no longer pass through the AND gate 42, and the 2-bit counter 33 stops counting. The number of clocks appearing at the output of the AND gate 42 in the meantime is four, and these clocks are the shift clocks of the shift register 29. Consequently, the most significant 4 bits of the data loaded into the shift register 29 by these clocks appear at the least significant 4 bits. That is, the data first loaded has been divided by 16, and the value of the register 29 is the average value of the aforementioned adder output.

On the other hand, simultaneously with the change of the Q output of the flip-flop 36 to L, the $\overline{Q}$ output of the flip-flop 36 becomes H. This H is connected to the load clock input of the up-down counter 22 and therefore, the content of the shift register 29, i.e., said average value, is loaded into the up-down counter.

In this manner, the content of the counter 22 becomes the average value in the above-described 90° phase difference control, and thereafter, a pulse having a phase difference relation based on this average value is applied to the amplifier 8 in the same manner as in the embodiment of FIG. 12.

As described above, in the present embodiment, feedback control is effected so that the phase difference between the frequency voltages applied to the driving electrodes is in a predetermined (particular) relation, and the average value of said phase difference relation which varies following the feedback control is found, and said phase difference relation is locked at said average value, and therefore the aforementioned frequency voltages can be substantially held in said particular relation and the irregularity of revolution by the feedback control can be prevented.

In the present embodiment, the shifting operation of the register is utilized when the average value is found, but instead, a logic dividing circuit may be provided.

Also, division is made by the number of times of the inputting of the count value periodically input to the counter 22 when the average value is found, but the division may also be made with the time during which the count value is input to the counter 22 as a function. Further, the above-described operational process may be carried out by an analog operation.

Figure 16:
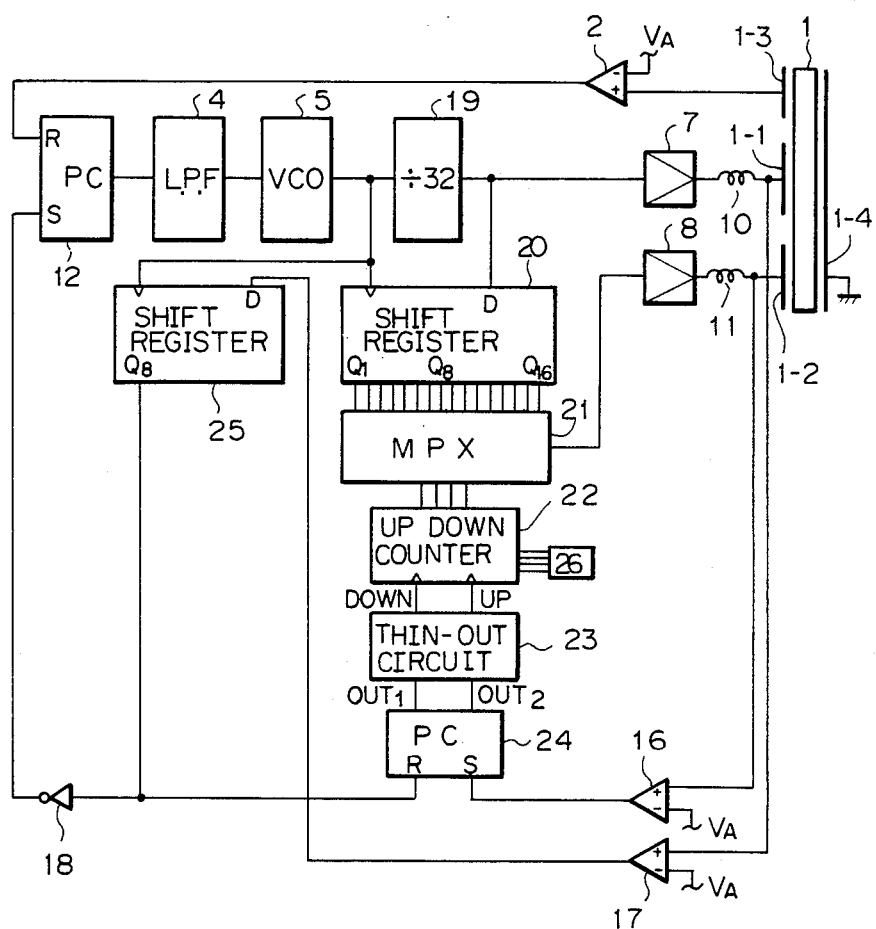
FIG. 16 is a block diagram showing still another embodiment of the present invention.

FIG. 16 is a circuit diagram showing another embodiment of the present invention. In FIG. 16, components identical to those in the embodiment of FIG. 4 are given identical reference numerals. This embodiment differs from the embodiment of FIG. 4 in that a thinning circuit 23 is interposed between the comparator 24 and the counter 22.

Operation of the FIG. 16 embodiment will now be described.

By a main switch, not shown, being closed, the power-up set circuit 26 is operated and the initial value (e.g. 0111) is set in the counter 22. It is to be understood that in this state, the multiplexer 21 selects the output end $Q_8$ of the register 20.

As described above, the output ends $Q_1$-$Q_8$ of the register 20 provide signals delayed by 11.25° each relative to the D input signal thereof and therefore, the pulse of the output end $Q_8$ is a pulse delayed by $11.25 \times 8 = 90°$ relative to the pulse of the D input end. On the other hand, the VCO 5 starts operating upon closing of the main switch and therefore, the pulse from the VCO 5 is input to the frequency dividing circuit 19, which thus outputs a pulse obtained by dividing the pulse of the VCO 5 into 32 and applies this pulse to the electrode 1-1 through the amplifier 7 and coil 10.

On the other hand, as described above, from the multiplexer 21, the pulse of the output $Q_8$ of the register 20, i.e., a pulse which is 90° out of phase with the pulse of the frequency dividing circuit 19, is applied to the electrode 1-2 through the amplifier 8 and coil 11. By the actions of the coils 10 and 11 and the electrodes 1-1, 1-2 and 1-4, said pulses are applied to the electrodes 1-1 and 1-2 as sine waves which are 90° out of phase with each other, whereby a travelling vibration wave is generated in the surface of the stator 1, and the moving member which is in frictional contact with the surface of the stator is rotated and the SSM is operated. The wave forms of the electrodes 1-1 and 1-2 are converted to pulses by the comparators 16 and 17, respectively, and the pulse of the comparator 16 is applied to the S input end of the comparator 24.

On the other hand, the pulse of the comparator 17 is transmitted to the D input end of the register 25, and since this register is operating with the pulse of the VCO 5 as the clock, the output of the comparator 17, i.e., a pulse delayed by 90° in phase relative to the wave form of the electrode 1-1, is output from the output end $Q_8$, and it is input to the R input end of the comparator 24. Assuming that the wave form of the electrode 1-2 is delayed by 90° relative to the wave form of the electrode 1-1, the pulse from the output end $Q_8$ of the register 25 is delayed by 90° relative to the wave form of the electrode 1-1 and therefore, pulses of the same phase are input to the R and S input ends of the comparator 24. Consequently, in this state, the SSM continues to be driven with the pulse from the output end $Q_8$ of the register 20 remaining selected.

During said driving, even in a state wherein pulses different by 90° in phase are input to the amplifiers 7 and 8 with the output end $Q_8$ of the register 20 being selected, if the driving wave forms to the electrodes 1-1 and 1-2 do not keep the 90° phase difference relation, the direction of count of the counter 22 is determined in conformity with the direction of phase shift relative to the 90° phase difference relation. That is, when the phase difference between the wave forms of the electrodes 1-1 and 1-2 is within 90°, L is delivered from the output OUT2 of the comparator 24 during each period of the applied voltage to the electrode 1-2, and this L is input to the thinning circuit 23 and the L is delivered twice from OUT2, whereby the counter 22 is counted up by one and thereby the multiplexer 21 changes over the output end of the register from $Q_8$ to $Q_9$. Since the pulse of the output end $Q_9$ is a pulse having a phase delayed by 11.25° relative to the pulse of the output end $Q_8$, the phase difference of the pulse applied to the amplifier 8 relative to the pulse applied to the amplifier 7 shifts from 90° to 101.25°. Consequently, the phase of the applied wave form of the electrode 1-2 is delayed and the phase difference between the wave forms applied to the electrodes 1-1 and 1-2 is shifted toward 90°. Conversely, when the phase difference between the pulses applied to the amplifiers 7 and 8 keeps 90° and the phase difference between the electrodes 1-1 and 1-2 is 90° or more, the counter 22 is counted down by one. Thereby the multiplexer 21 selects the output end $Q_7$ instead of the output end $Q_8$ of the register 20. Consequently, the phase difference of the pulse applied to the amplifier 8 relative to the pulse to the amplifier 7 becomes 78.75° which is advanced by 11.25° from 90°, and the wave form applied to the electrode 1-2 is more advanced, and the phase difference between the wave forms of the electrodes 1-1 and 1-2 is shifted toward 90°.

In the manner described above, the phase difference relation between the wave forms applied to the electrodes 1-1 and 1-2 is controlled so as to be always 90°.

Assuming that as described above, the electrical characteristic between the electrode 1-1 and the electrode 1-4 and the electrical characteristic between the electrode 1-2 and the electrode 1-4 vary depending on the rotational position of the moving member, the phase difference between the applied signals to the electrodes 1-1 and 1-2 varies in a short period. Consequently, in an extreme case, during said 90° phase difference control, L is delivered from the output OUT1 or OUT2 of the comparator 24 each time the comparing operation in the comparator 24 is effected, that is, in each period of the applied voltage to the electrode 1-2, but since design is made such that as described above, the output of the comparator 24 is transmitted to the counter 22 through the thinning circuit 23, the counter 22 effects one count up or down operation each time L is delivered twice from the output OUT1 or OUT2 of the comparator 24. Consequently, the changing operation of the pulse applied to the amplifier 8 during the 90° phase difference control is ½ of that when the thinning circuit is absent, and the irregularity of revolution of the SSM can be decreased as compared with a case where the change of the pulse to the amplifier 8 is effected in a short period during the 90° phase difference control, that is, a case where said change is directly effected without the use of the thinning circuit.

By the above-described operation, the phase difference between the wave forms in the electrodes 1-1 and 1-2 is controlled so as to be kept constant, and again in the present embodiment, as in the embodiment of FIG. 4, frequency control is effected so that the SSM is driven always at a resonance frequency.

Figure 17C:
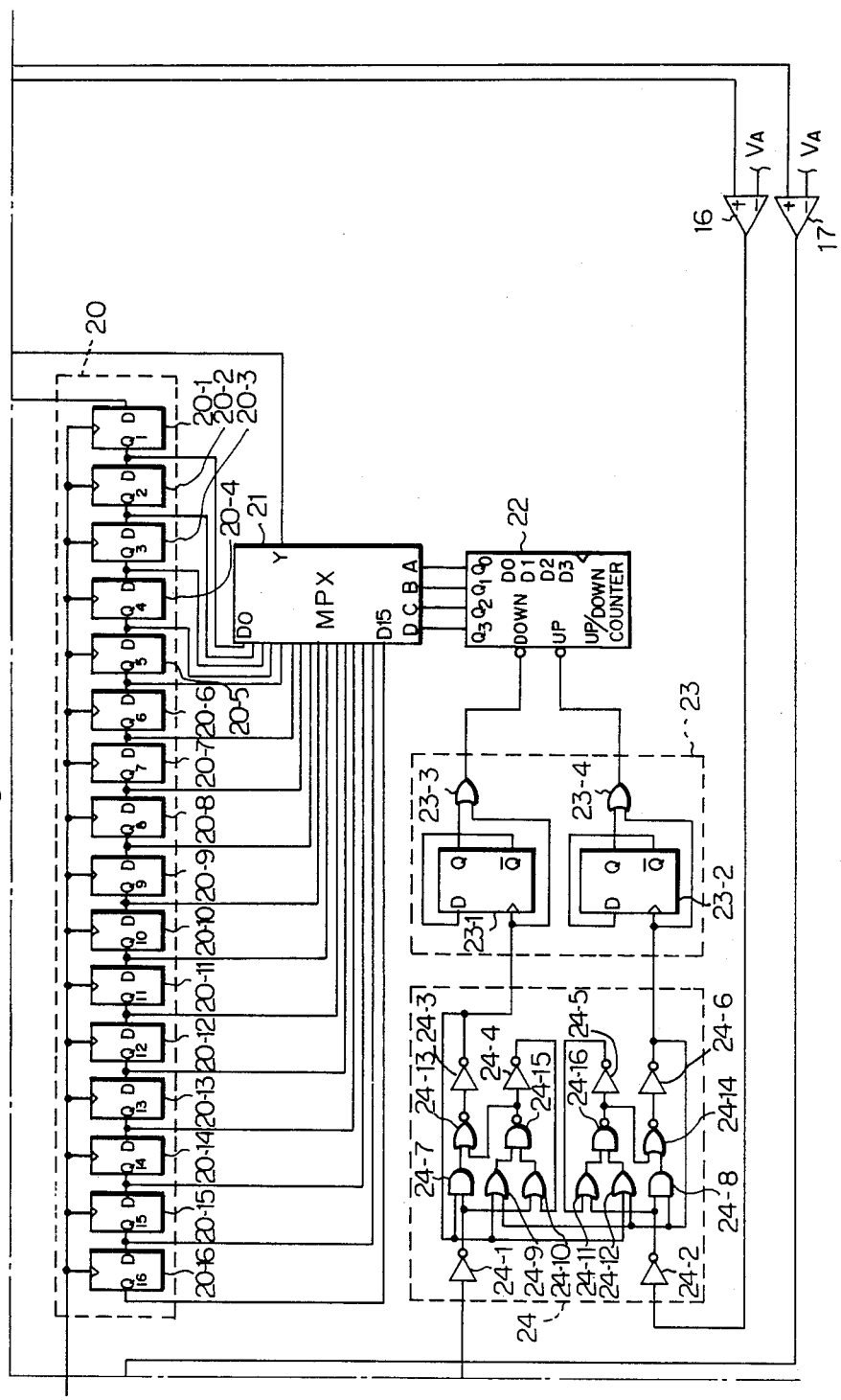
FIG. 17, consisting of FIGS. 17A, B and C, is a circuit diagram showing a specific construction of the embodiment of FIG. 16.

FIG. 17 is a circuit diagram showing a specific circuit construction of the circuit shown in FIG. 16. In FIG. 17, components identical to those in the embodiment of FIG. 10 are given identical reference numerals. The embodiment of FIG. 17 differs from the embodiment of FIG. 10 only in that a thinning circuit 23 is provided.

In the thinning circuit 23, reference numerals 23-1 and 23-2 designate D type flip-flops which respond to the signal change of L—H, and reference numerals 23-3 and 23-4 denote OR gates.

The operation of the circuit of FIG. 17 is the same as that described in connection with FIG. 10 and therefore need not be described, and the operation of the thinning circuit 23 will hereinafter be described supplementally.

Figure 18:
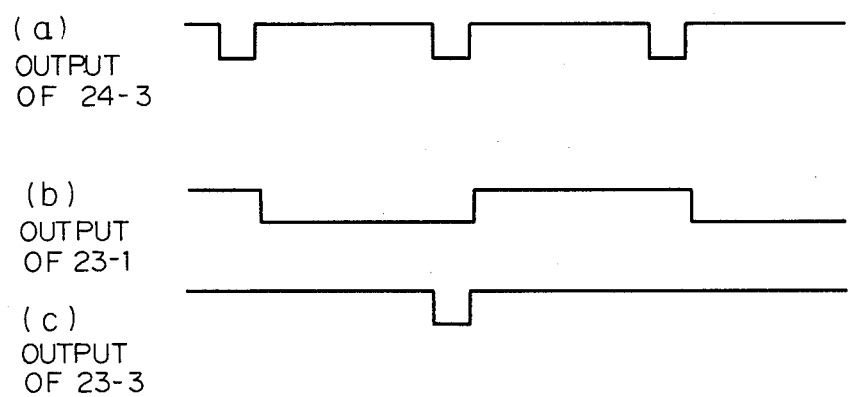
FIGS. 18(a), (b) and (c) are wave form diagrams for illustrating the operation of the thinning circuit 23 of FIG. 17.

Let it be assumed that in the initial state, the Q outputs of the flip-flops 23-1 and 23-2 are H. In this state, L is delivered from the comparator 24 as shown in FIG. 18(a), and by the change of this L to H, the flip-flop 23-1 renders the Q output into L as shown in FIG. 18(b). At this time, the OR gate 23-3 does not respond to the L of the comparator 24 but keeps on delivering H as shown in FIG. 18(c) because the OR gate 23-3 is connected to the output of the D flip-flop 23-3 and the output of the comparator 4. Thereafter, when L is further delivered from the comparator 12, the OR gate 23-3 outputs L from the comparator 12 and transmits it to the counter 22 to cause the counter 22 to effect its counting operation because at this point of time, the Q output of the flip-flop 23-1 becomes L. Thus, the thinning circuit transmits L as a count signal to the counter 22 only when the output of the comparator 24 becomes L twice.

When L is delivered from the OR gate 23-3 in the described manner, the Q output of the flip-flop 23-1 becomes H, whereafter the above-described operation is repeated. Also, the flip-flop 23-2 and the OR gate 23-4 perform entirely the same operations as the flip-flop 23-1 and the OR gate 23-3.

As described above, in the driving circuit of the motor according to the present embodiment wherein the wave forms of the driving electrodes 1-1 and 1-2 are detected and feedback control is effected so that the phase difference therebetween is constant, said feedback control is effected intermittently (in the present embodiment, at a rate of one time per two times of the synchronization of the driving signals to the electrodes) and therefore, even when the feedback control has been effected, the probability with which the duty ratio of the applied pulse to the amplifier 8 varies can be decreased and irregularity of revolution can be prevented.

Also, in the present embodiment, the thinning operation is effected at a rate of one time per two periods of the applied frequency signal to the driving electrode, but this rate may be suitably determined.

A timer which outputs a predetermined time signal at each predetermined time may be disposed as a circuit for effecting said thinning operation, and design may be made such that the output of the comparator 24 is transmitted to the counter 22 only while the output of said timer is being produced.

Further, in the present embodiment, design may be made such that the wave forms of the electrodes 1-1 and 1-2 are directly detected by a comparator, and the count value of the counter 22 may be counted up or down when the phase difference between said wave forms increases or decreases relative to 90°. In such case, use may be made of a comparator which outputs OUT1 and OUT2 with the phase difference of 90° as the reference.

We claim:

1. A vibration wave motor having a first member in which are disposed an electro-mechanical energy converting element portion to which a first frequency signal is applied and an electro-mechanical energy converting element portion to which a second frequency signal is applied and in the surface of which a travelling vibration wave is formed upon application of each of said frequency signals, and a second member driven relative to said first member by the vibration wave in said first member, said vibration wave motor having:
   (a) a detecting circuit for detecting the phase difference between said first and second frequency signals; and
   (b) a control circuit for controlling the phase difference between said first and second frequency signals on the basis of the result of the detection of said detecting circuit so as to be a particular phase difference.

2. A vibration wave motor according to claim 1, wherein said control circuit has shift means for shifting the phase of said second frequency signal in conformity with the result of the detection of said detecting circuit.

3. A vibration wave motor according to claim 1, wherein the first and second frequency signals are applied to said electro-mechanical energy converting element portions through first and second electrodes, respectively, and said detecting circuit detects the phase difference between the signal wave forms in said first and second electrodes.

4. A vibration wave motor according to claim 3, wherein said detecting circuit detects the direction of shift of the phase difference between the first and second frequency signals in the first and second electrodes relative to said particular phase difference and outputs a first signal when the phase difference between said first and second frequency signals increases relative to said particular phase difference, and outputs a second signal when the phase difference between said first and second frequency signals decreases relative to said particular phase difference, and said control circuit has a first signal forming circuit for supplying the first frequency signal to the first electrode, a second signal forming circuit for supplying the second frequency signal to the second electrode, and shift means for shifting the phase of the second frequency signal of the second signal forming circuit, and said shift means is responsive to said first signal to bring the phase of the second frequency signal close to the phase of the first frequency signal and responsive to said second signal to bring the phase of the second frequency signal away from the phase of the first frequency signal.

5. A vibration wave motor according to claim 1, wherein there is provided a thinning circuit for causing the phase difference control by said detecting circuit and said control circuit to be effected intermittently.

6. A vibration wave motor according to claim 3, wherein there is provided a thinning circuit for causing the phase difference control by said detecting circuit and said control circuit to be effected intermittently.

7. A vibration wave motor according to claim 1, wherein there are provided an operational circuit for finding the average value to the variation in the phase difference controlled by said control circuit, and a fixing circuit for fixing said phase difference at the average value found by said operational circuit.

8. A vibration wave motor according to claim 3, wherein there are provided an operational circuit for finding the average value to the variation in the phase difference controlled by said control circuit, and a fixing circuit for fixing said phase difference at the average value found by said operational circuit.

9. A vibration wave motor having a first member in which are disposed an electro-mechanical energy converting element portion to which a first frequency signal is applied and an electro-mechanical energy converting element portion to which a second frequency signal is applied and in the surface of which a travelling vibration wave is formed upon application of each of said frequency signals, and a second member driven relative to said first member by the vibration wave in said first member, said vibration wave motor having:
   (a) a first signal forming circuit for forming the first frequency signal;
   (b) a second signal forming circuit for forming the second frequency signal;
   (c) a detecting circuit for detecting the relation between the phase difference between the first frequency signal and the second frequency signal and a particular phase difference and outputting a first signal when said phase difference has become great relative to said particular phase difference, and outputting a second signal when said phase difference has become small relative to said particular phase difference;
   (d) shift means responsive to the first signal to bring the phase of the second frequency signal from the second signal forming circuit close to the phase of the first frequency signal and responsive to the second signal to bring the phase of the second frequency signal from the second signal forming circuit away from the phase of the first frequency signal; and
   (e) permitting means for permitting the response of said shift means to the signal from said detecting circuit each time the signal is output from the detecting circuit a predetermined plurality of times.

10. A vibration wave motor having a first member in which are disposed an electro-mechanical energy converting element portion to which a first frequency signal is applied and an electro-mechanical energy converting element portion to which a second frequency signal is applied and in the surface of which a travelling vibration wave is formed upon application of each of said frequency signals, and a second member driven relative to said first member by the vibration wave in said first member, said vibration wave motor having
   (a) a first signal forming circuit for forming the first frequency signal;
   (b) a second signal forming circuit for forming the second frequency signal;
   (c) a detecting circuit for detecting the relation between the phase difference between the first frequency signal and the second frequency signal and a particular phase difference and outputting a first signal when said phase difference has become great relative to said particular phase difference, and outputting a second signal when said phase difference has become small relative to said particular phase difference;
   (d) shift means responsive to the first signal to bring the phase of the second frequency signal from the second signal forming circuit close to the phase of the first frequency signal and responsive to the second signal to bring the phase of the second frequency signal from the second signal forming circuit away from the phase of the first frequency signal; and (e) an operational control circuit for finding the average value to the variation in the phase of the second frequency signal controlled by said shift means and fixing the phase of said second frequency signal at said average value.

11. A vibration wave motor according to claim 7, wherein the first and second frequency signals are applied to said electro-mechanical energy converting element portions through first and second electrodes, respectively, and said detecting circuit detects the phase difference between the signal wave forms in said first and second electrodes.

12. A vibration wave motor according to claim 8, wherein the first and second frequency signals are applied to said electro-mechanical energy converting element portion through first and second electrodes, respectively; and said detecting circuit detects the phase difference between the signal wave forms in said first and second electrodes.

13. A vibration wave motor according to claim 1, wherein said electro-mechanical energy converting element portions are electrostrictive element portions.

14. A vibration wave motor according to claim 7, wherein said electro-mechanical energy converting element portions are electrostrictive element portions.

15. A vibration wave motor according to claim 8, wherein said electro-mechanical energy converting element portions are electrostrictive element portions.

16. A vibration wave motor according to claim 1, wherein said particular phase difference is 90°.

17. A vibration wave motor according to claim 7, wherein said particular phase difference is 90°.

18. A vibration wave motor according to claim 8, wherein said particular phase difference is 90°.

* * * * *

UNITED STATES PATENT AND TRADEMARK OFFICE
CERTIFICATE OF CORRECTION

PATENT NO. : 4,713,571

DATED : December 15, 1987

INVENTOR(S) : N. SUZUKI, ET AL.

It is certified that error appears in the above-identified patent and that said Letters Patent is hereby corrected as shown below:

COLUMN 4

Line 10, "smoothes" should read --smooths--.

COLUMN 6

Line 62, "$Q_7$" should read --$Q_7$.--.

COLUMN 9

Line 50, "smoothes" should read --smooths--.

COLUMN 11

Line 50, "capacitor 11" should read --capacitor 5-11--.

COLUMN 13

Line 58, "ends" should read --terminals--.

COLUMN 15

Lines 19-20:
        "one.
           Thereby" should read
    --one.  Thereby--.
    Line 63, "substracts" should read --subtracts--.

UNITED STATES PATENT AND TRADEMARK OFFICE
CERTIFICATE OF CORRECTION

PATENT NO. : 4,713,571

DATED : December 15, 1987

INVENTOR(S) : N. SUZUKI, ET AL.

It is certified that error appears in the above-identified patent and that said Letters Patent is hereby corrected as shown below:

COLUMN 16

Lines 52-53:
"FIG. 12.
    In" should read
--FIG. 12. In--.

COLUMN 17

Line 9, "$Q_0$-$Q_7$L" should read --$Q_0$-$Q_7$ L--.
Line 24, "REST." should read --RESET.--.

COLUMN 18

Line 44, "22,i.e.," should read --22, i.e.,--.

COLUMN 19

Line 3, "same," should read --same time,--.

UNITED STATES PATENT AND TRADEMARK OFFICE
CERTIFICATE OF CORRECTION

PATENT NO. : 4,713,571
DATED : December 15, 1987
INVENTOR(S) : N. SUZUKI, ET AL

It is certified that error appears in the above-identified patent and that said Letters Patent is hereby corrected as shown below:

COLUMN 22

Line 9, "L-H," should read --L → H,--.
    Line 23, "23-3" should read --23-1--.

Signed and Sealed this

Ninth Day of August, 1988

Attest:

DONALD J. QUIGG

Attesting Officer     Commissioner of Patents and Trademarks